US012719051B2

(12) United States Patent
Kim et al.

(10) Patent No.: US 12,719,051 B2
(45) Date of Patent: Aug. 25, 2026

(54) COMPOSITE POSITIVE ELECTRODE ACTIVE MATERIAL FOR LITHIUM SECONDARY BATTERY, METHOD OF PREPARING SAME, AND LITHIUM SECONDARY BATTERY CONTAINING POSITIVE ELECTRODE INCLUDING SAME

(71) Applicant: Samsung SDI Co., Ltd., Yongin-si (KR)

(72) Inventors: Youngki Kim, Yongin-si (KR); Yongmok Cho, Yongin-si (KR); Sungho Choo, Yongin-si (KR); Sangmi Kim, Yongin-si (KR); Minjae Choi, Yongin-si (KR); Jaeyoung Jeong, Yongin-si (KR); Hyunjei Chung, Yongin-si (KR)

(73) Assignee: SAMSUNG SDI CO., LTD., Gyeonggi-Do (KR)

(*) Notice: Subject to any disclaimer, the term of this patent is extended or adjusted under 35 U.S.C. 154(b) by 758 days.

(21) Appl. No.: 17/981,727

(22) Filed: Nov. 7, 2022

(65) Prior Publication Data

US 2023/0146800 A1 May 11, 2023

(30) Foreign Application Priority Data

Nov. 8, 2021 (KR) ........................ 10-2021-0152436

(51) Int. Cl.
*H01M 4/00* (2006.01)
*H01M 4/36* (2006.01)
(Continued)

(52) U.S. Cl.
CPC ........... *H01M 4/525* (2013.01); *H01M 4/366* (2013.01); *H01M 4/485* (2013.01); (Continued)

(58) Field of Classification Search
CPC ...... H01M 4/525; H01M 4/366; H01M 4/485; H01M 10/0525; H01M 10/052; H01M 2004/028
See application file for complete search history.

(56) References Cited

U.S. PATENT DOCUMENTS

2014/0045067 A1* 2/2014 Cho .................. C01G 45/1235 429/231.95
2016/0020456 A1 1/2016 Song et al.
(Continued)

FOREIGN PATENT DOCUMENTS

KR 20090080939 A 7/2009
KR 20130118196 A 10/2013
(Continued)

*Primary Examiner* — Nicholas P D'Aniello
(74) *Attorney, Agent, or Firm* — CANTOR COLBURN LLP

(57) ABSTRACT

A composite positive electrode active material for a lithium secondary battery, the composite positive electrode active material including: a lithium cobalt oxide particle; and a particle coating portion in a form of an island and on a first surface of the lithium cobalt oxide particle, the particle coating portion including a first coating layer including a lithium titanium oxide, wherein the lithium cobalt oxide particle includes a lithium-deficient cobalt oxide phase positioned between the particle coating portion and a core of the lithium cobalt oxide particle, the lithium-deficient cobalt oxide phase having a molar ratio of lithium to cobalt of about 0.9 or less, and a surface coating portion located between a second surface of the lithium cobalt oxide particle and the core of the lithium cobalt oxide particle.

25 Claims, 29 Drawing Sheets

(51) Int. Cl.

| | |
|---|---|
| ***H01M 4/485*** | (2010.01) |
| ***H01M 4/525*** | (2010.01) |
| ***H01M 10/0525*** | (2010.01) |
| *H01M 4/02* | (2006.01) |
| *H01M 10/052* | (2010.01) |

(52) U.S. Cl.
CPC .. *H01M 10/0525* (2013.01); *H01M 2004/028* (2013.01); *H01M 10/052* (2013.01)

(56) References Cited

U.S. PATENT DOCUMENTS

| | | | | |
|---|---|---|---|---|
| 2016/0079597 | A1 | 3/2016 | Fujiki et al. | |
| 2017/0222211 | A1 | 8/2017 | Ryu et al. | |
| 2018/0248179 | A1* | 8/2018 | Wang | C01G 53/50 |
| 2018/0316007 | A1 | 11/2018 | Jo et al. | |
| 2020/0067091 | A1* | 2/2020 | Jo | H01M 4/1391 |
| 2020/0343537 | A1 | 10/2020 | Jo et al. | |
| 2022/0367860 | A1 | 11/2022 | Cho et al. | |
| 2022/0388865 | A1 | 12/2022 | Kim et al. | |
| 2023/0141441 | A1 | 5/2023 | Kim et al. | |
| 2023/0144644 | A1 | 5/2023 | Kim et al. | |
| 2023/0147051 | A1 | 5/2023 | Kim et al. | |

FOREIGN PATENT DOCUMENTS

| | | | |
|---|---|---|---|
| KR | 20160032664 | A | 3/2016 |
| KR | 20160040116 | A | 4/2016 |
| KR | 20170142428 | A | 12/2017 |
| KR | 20190054977 | A | 5/2019 |
| KR | 20210064155 | A | 6/2021 |

* cited by examiner

FIG. 2B1
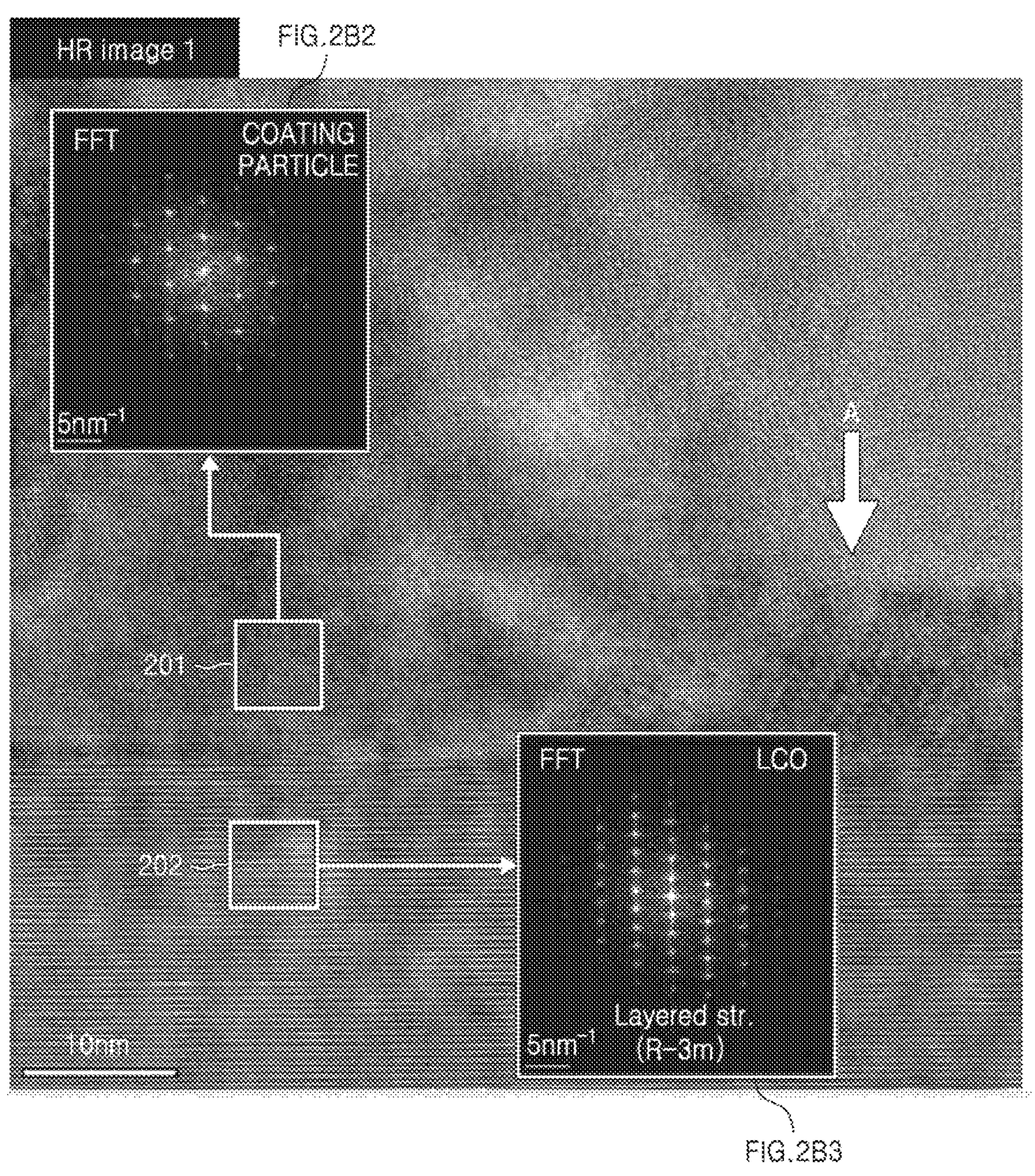

FIG. 2C1
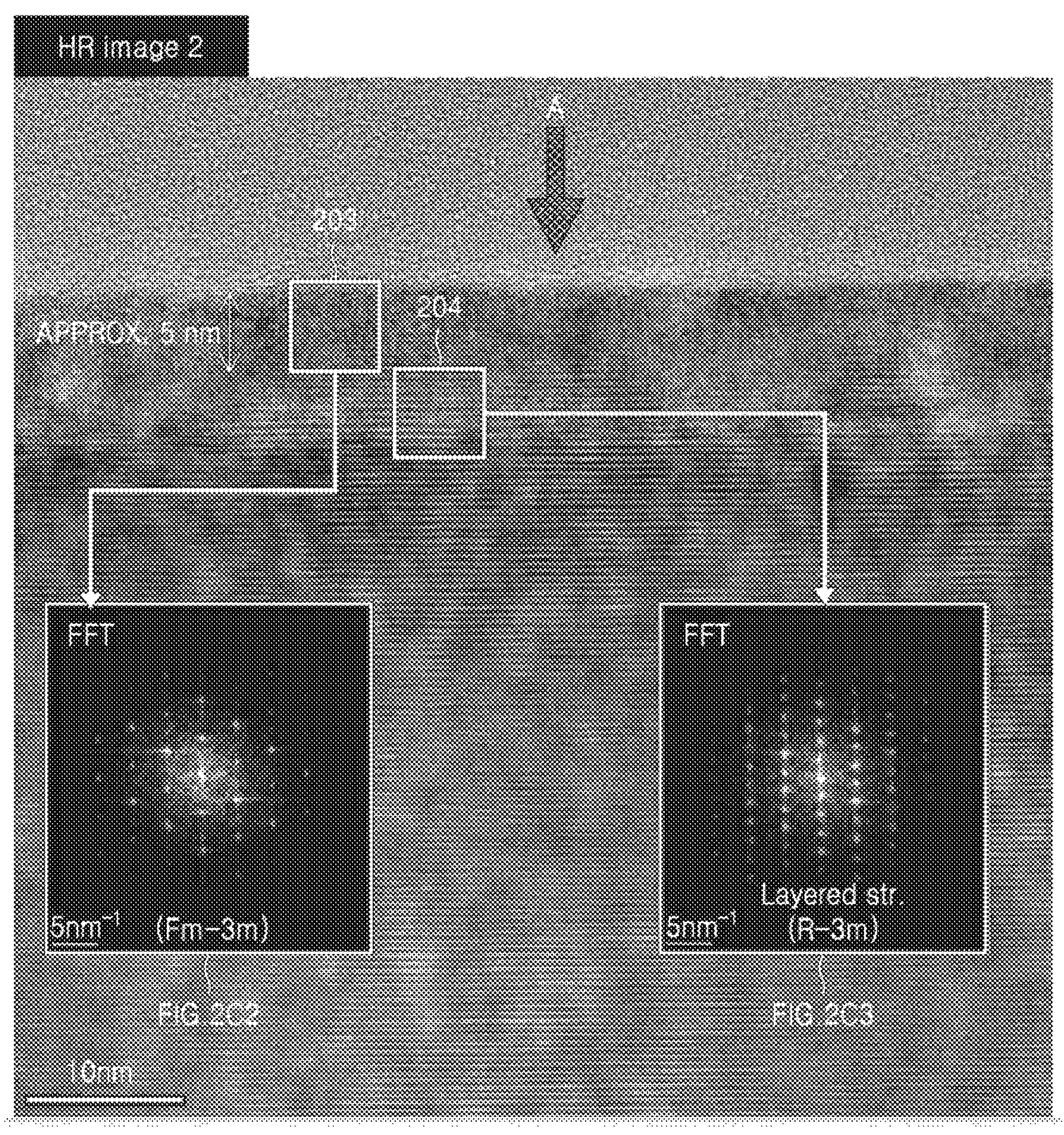

FIG. 8B1
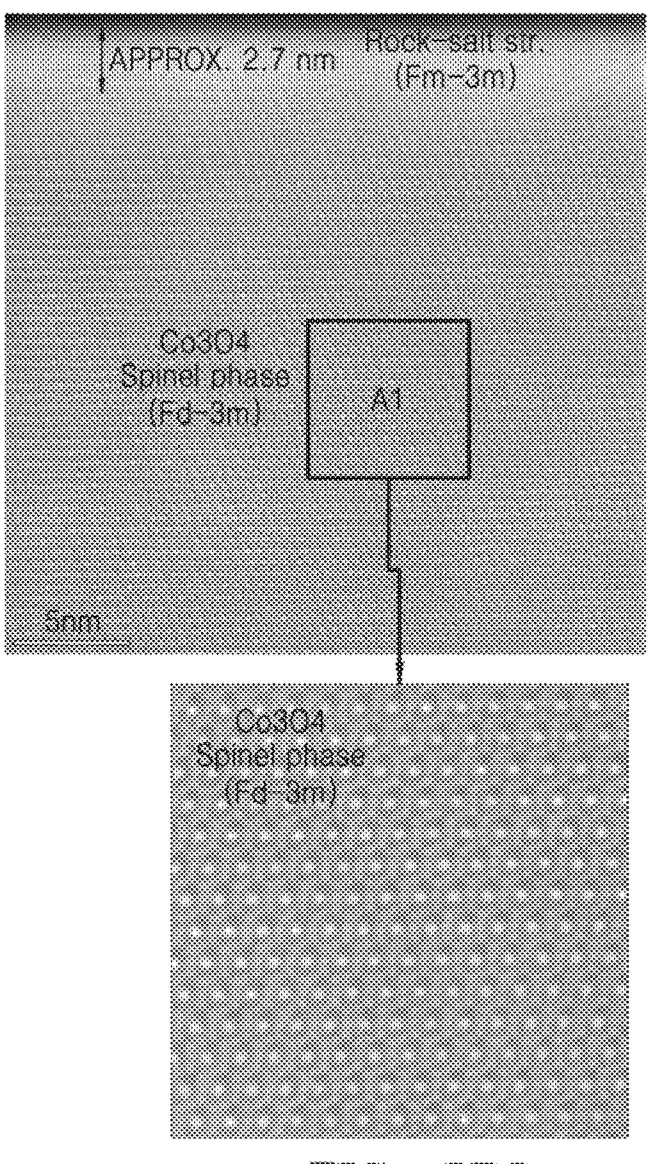
FIG. 8B2

FIG. 8C1
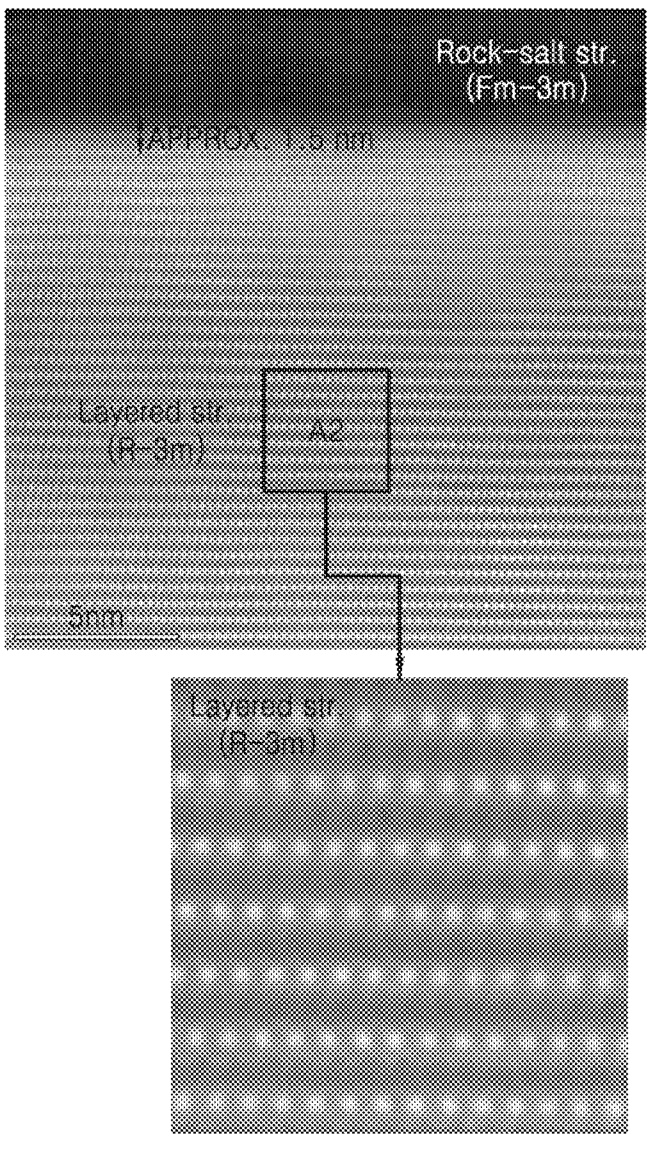
FIG. 8C2

COMPOSITE POSITIVE ELECTRODE ACTIVE MATERIAL FOR LITHIUM SECONDARY BATTERY, METHOD OF PREPARING SAME, AND LITHIUM SECONDARY BATTERY CONTAINING POSITIVE ELECTRODE INCLUDING SAME

CROSS-REFERENCE TO RELATED APPLICATION

This application is based on and claims priority to Korean Patent Application No. 10-2021-0152436, filed on Nov. 8, 2021, in the Korean Intellectual Property Office, and all the benefits accruing therefrom under 35 U.S.C. § 119, the content of which is incorporated by reference herein in its entirety.

BACKGROUND

1. Field

This disclosure relates to a composite positive electrode active material for a lithium secondary battery, a method of preparing the same, and a lithium secondary battery containing a positive electrode including the same.

2. Description of the Related Art

In recent years, as miniaturization and weight reduction of electronic devices are made possible with advancements in the high-tech electronics industry, the use of portable electronic devices is increasing. As power sources for such portable electronic devices, lithium secondary batteries having high energy density and a long battery life have been widely used.

Lithium cobalt oxide ($LiCoO_2$) is widely used as a positive electrode active material for a high-density lithium secondary battery. However, there remains a need for an improved positive electrode active material comprising lithium cobalt oxide.

SUMMARY

Disclosed is a novel composite positive electrode active material for a lithium secondary battery with improved stability, and a method of preparing the composite positive electrode active material.

Also, disclosed is a lithium secondary battery with improved stability at a high voltage and improved high-temperature characteristics, using a positive electrode including the above-described composite positive electrode active material for a lithium secondary battery.

Additional aspects will be set forth in part in the description which follows and, in part, will be apparent from the description, or may be learned by practice of the presented embodiments of the disclosure.

According to an embodiment, a composite positive electrode active material for a lithium secondary battery, the composite positive electrode active material includes: a lithium cobalt oxide particle; and a particle coating portion in a form of an island and on a first surface of the lithium cobalt oxide particle, the particle coating portion including a first coating layer including a lithium titanium oxide, wherein the lithium cobalt oxide particle comprises a lithium-deficient cobalt oxide phase positioned between the particle coating portion and a core of the lithium cobalt oxide particle, the lithium-deficient cobalt oxide phase having a molar ratio of lithium to cobalt of 0.9 or less, and a surface coating portion located between a second surface of the lithium cobalt oxide particle and the core of the lithium cobalt oxide particle.

According to an embodiment, a method of preparing a composite positive electrode active material for a lithium secondary battery, the method includes: mixing a lithium cobalt oxide, a titanium precursor, and cobalt hydroxide to obtain a first precursor mixture; heat-treating the first precursor mixture to form a heat-treated first precursor mixture; mixing the heat-treated first precursor mixture with a zirconium precursor to obtain a second precursor mixture; and heat-treating the second precursor mixture, to thereby prepare the composite positive electrode active material described above.

The heat-treating of the first precursor mixture may comprise heat-treating at about 850° C. to about 980° C., and the heat-treating of the second precursor mixture may comprise heat-treating at about 750° C. to about 900° C.

According to an embodiment, a lithium secondary battery includes: a positive electrode including the above-described composite positive electrode active material; a negative electrode; and an electrolyte between the positive electrode and the negative electrode.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2B1 shows the results of high-resolution transmission electron microscopy (HR-TEM) analysis of a composite positive electrode active material of Example 1;

FIGS. 2B2 and 2B3 each show crystal structure analysis results of indicated regions 201 and 202, respectively, in FIG. 2B1;

FIG. 2C1 shows the results of high-resolution transmission electron microscopy (HR-TEM) analysis of a composite positive electrode active material of Example 1;

FIGS. 2C2 and 2C3 each show crystal structure analysis results of indicated regions 203 and 204, respectively, in FIG. 2C1;

FIGS. 8B1 and 8B2 are each a TEM image and a crystal structure image of region A1 of a lithium-deficient cobalt oxide phase of FIG. 8A;

FIGS. 8C1 and 8C2 are each a TEM image and a crystal structure image of region A2 of a surface coating portion of FIG. 8A;

DETAILED DESCRIPTION

Figure 1A:
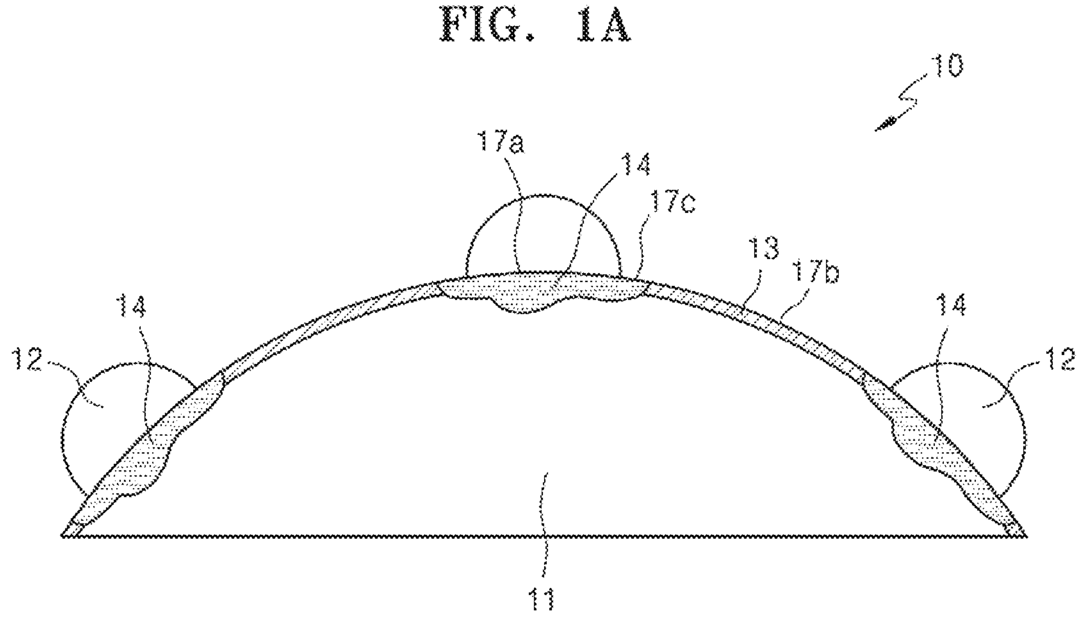
FIG. 1A is a schematic view of an embodiment of a structure of a composite positive electrode active material.

Reference will now be made in detail to embodiments, examples of which are illustrated in the accompanying drawings, wherein like reference numerals refer to like elements throughout the specification. In this regard, the present embodiments may have different forms and should not be construed as being limited to the descriptions set forth herein. Accordingly, the embodiments are merely described below, by referring to the figures, to explain various aspects of the present description. These embodiments are provided so that this disclosure will be thorough and complete, and will fully convey the scope of the invention to those skilled in the art. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

End points in ranges may be independently combined. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinbelow, a composite positive electrode active material, a method of preparing the same, and a lithium secondary battery including a positive electrode including the same according to example embodiments will be described in greater detail.

A composite positive electrode active material according to an embodiment may include a lithium cobalt-based oxide particle, and a particle coating portion in a form of an island on a first surface of the lithium cobalt-based oxide particle, the particle coating portion comprising a first coating layer comprising a lithium titanium-based oxide (e.g., $Li_2Ti_{0.97}Co_{0.02}Mg_{0.01}O_3$), wherein the lithium cobalt-based oxide particle comprises a lithium-deficient cobalt oxide phase positioned between the particle coating portion and a core of the lithium cobalt-based oxide particle, the lithium-deficient cobalt oxide phase having a molar ratio of lithium to cobalt of 0.9 or less, and a surface coating portion located between a second surface of the lithium cobalt-based oxide particle and the core of the lithium cobalt oxide-based particle.

The lithium-deficient cobalt oxide phase is included in an inner region of the lithium cobalt-based oxide particle that is positioned to correspond to the particle coating portion. In an aspect, the lithium-deficient cobalt oxide phase is positioned between the particle coating portion and a core of the lithium cobalt oxide-based particle. As used herein, the phrase "positioned to correspond to the particle coating portion" means that the inner region is positioned in close proximity to the particle coating portion, where the inner region may be in contact with the particle coating portion, or spaced apart therefrom. In an aspect, the lithium-deficient cobalt oxide phase may be between the core of the lithium cobalt oxide particle and the first surface of the lithium cobalt oxide particle. In an aspect, the lithium-deficient cobalt oxide phase may be between the core of the lithium cobalt oxide particle and the first surface and a third surface of the lithium cobalt oxide particle.

The inner region of the lithium cobalt-based oxide that is in contact with the particle coating portion is referred to as a "first inner region." In addition, the surface coating portion is located in the inner region of the second surface of the lithium cobalt-based oxide, and the surface coating portion contains a third coating layer having a spinel crystal structure. The inner region of the second surface of the lithium cobalt-based oxide represents the remaining region of the lithium cobalt-based oxide that is not included in the first inner region, and is referred to as a "second inner region." In particular, the second surface of the lithium cobalt-based oxide refers to the remaining surface of the lithium cobalt-based oxide, that is not the surface on which the particle coating portion is formed (that is, the first surface).

A lithium cobalt-based oxide ($LiCoO_2$) is a high-capacity positive electrode active material that has a O3 layer structure, that is, a structure in which lithium, cobalt, and oxygen are ordered in a O—Li—O—Co—O—Li—O—Co—O sequence along the [111] lattice plane in rock salt structure. When charging a lithium secondary battery including a positive electrode including the lithium cobalt-based oxide, lithium ions are deintercalated from the lattice in the crystal lattice of the lithium cobalt-based oxide.

If a charge voltage of the lithium secondary battery increases, the amount of deintercalated lithium ions increases, and as a consequence, at least some of the O3 layer structure may undergo a phase transition to an O1 layer structure (O1 phase) that has no Li in the crystal lattice. Therefore, with the charge voltage in a range of 4.52 Volts (V) or greater (based on a full cell), there may be a phase transition to a H1-3 layer structure (H1-3 phase) where the O3 layer structure and the O1 layer structure co-exist inside the crystal lattice of the lithium cobalt-based oxide. Such phase transitions to the H1-3 and the O1 layer structures from the O3 layer structure are, at least partially, irreversible. Also, the amount of intercalatable/deintercalatable lithium ions decreases in the H1-3 and the O1 layer structures. Such phase transitions inevitably result in a drastic decrease in storage properties and lifespan characteristics of the lithium secondary battery. In addition, when the lithium cobalt-based oxide comes in contact with electrolyte solution, especially at high temperatures, HF corrosion degrades interfacial structures, causing cobalt leaching and capacity fading, and positive electrode active materials having a layered structure may undergo structural collapse in high voltage environments. To prevent structural collapse of the positive electrode active material of a layered structure in a high-voltage environment, the lithium cobalt oxide is doped with aluminum. However, and while not wanting to be bound by theory, it is understood that doping with aluminum as described above to reach a satisfactory level causes high-voltage characteristics to fail, and thus, there remains a need for a more stable material.

The composite positive electrode active material according to an embodiment is conceived to address the above-described issue. The composite positive electrode active material according to an embodiment may be obtained by reacting a lithium cobalt-based oxide particle having a predetermined content of aluminum and magnesium, with titanium (Ti), zirconium (Zr), or cobalt (C) precursors. As magnesium of the lithium cobalt-based oxide particle migrates to the surface through a Mg—Ti Kirkendall effect, a particle coating portion with a first coating layer containing a lithium titanium-based oxide is formed in a form of an island on the surface of the lithium cobalt-based oxide particle.

In the composite positive electrode active material according to an embodiment, reaction areas between the composite positive electrode active material and an electrolyte solution decrease due to the presence of the particle coating portion and the surface coating portion described above, and thus, side reactions are efficiently suppressed.

In a region contacting the particle coating portion inside the lithium cobalt-based oxide particle, a lithium-deficient cobalt oxide phase having a molar ratio of lithium to cobalt of about 0.9 or less, about 0.1 to about 0.9, about 0.3 to about 0.9, about 0.3 to about 0.7, about 0.3 to about 0.5, may be included. Here, the lithium-deficient cobalt oxide phase has p-semiconductor characteristics, and thus improves electrical conductivity of the composite positive electrode active material, in particular, exhibiting excellent capacity, life and output characteristics in high-voltage conditions.

According to an embodiment, the composite positive electrode active material comprises the lithium cobalt-based oxide particle, and a particle coating portion in a form of an island is located on a first surface of the lithium cobalt-based oxide particle, and a surface coating portion is located in a first inner region contacting or adjacent to a second surface of the lithium cobalt-based oxide particle.

The particle coating portion may include a first coating layer containing a lithium titanium-based oxide.

A second coating layer containing a lithium zirconium-based oxide (e.g., $LiZrO_2$) may be further disposed on the first coating layer. In particular, the surface coating portion may include a third coating layer having a spinel crystal structure, and a lithium-deficient cobalt oxide phase that is in a lithium-deficient state, having a molar ratio of lithium to cobalt of about 0.9 or less, may be included in the first inner region of the lithium cobalt-based oxide particle that is in contact with the particle coating portion described above.

According to an embodiment, the lithium cobalt-based oxide particle may include magnesium and aluminum. An aluminum content (Al) of the lithium cobalt-based oxide particle may be about 4,000 parts per million (ppm) or greater, for example, about 4,000 ppm to about 6,000 ppm, about 4,000 ppm to about 5,500 ppm, about 4,500 ppm to about 5,000 ppm. In this specification, the aluminum content in ppm refers to a number of units by mass of aluminum with respect to a million units by mass of a total composite positive electrode active material.

The aluminum content may be about 1.5 mole percent (mol %) to about 3.0 mol %, or about 2.0 mol % to about 2.5 mol %, with respect to a total amount of other metals, except lithium, in the core active material. When the aluminum content is within the above range, the structural stability of the composite positive electrode active material is improved, and thus, the composite positive electrode active material having improved high-voltage characteristics and minimized capacity decrease, and minimized resistance increase can be obtained. Further, a magnesium (Mg) content of the lithium cobalt-based oxide particle may be about 1,000 ppm or greater, for example, about 1,000 ppm to about 1,500 ppm. In this specification, the magnesium content in ppm refers to a number of units of mass of magnesium with respect to million units of mass of the total composite positive electrode active material. The magnesium content may be about 0.25 mol % to about 0.7 mol %, or about 0.3 mol % to about 0.6 mol %, with respect to the total amount of metals in the core active material.

Even when the aluminum content in the composite positive electrode active material is about 4,000 ppm or greater as described above, there is little diffusion of aluminum into coating layers as the aluminum content increases, and structural stabilization can be achieved as some Al is doped in Li sites. Thus, high temperature characteristics and surface resistance of the composite positive electrode active material are improved, providing excellent conductivity. Therefore, such a composite positive electrode active material has improved structural stability of the crystal structure of the lithium cobalt-based oxide particle even in high-temperature and high-voltage conditions, and consequently, a positive electrode active material with excellent lifetime and storage properties and improved resistance characteristics can be realized.

High voltage in this application means a voltage in a range of about 4.3 V to about 4.8 V, e.g., greater than 4.3 V, versus $Li/Li^+$.

According to an embodiment, the composite positive electrode active material may have a titanium content of about 500 ppm to about 800 ppm, and a zirconium content of about 2,100 ppm to about 4,000 ppm. In this application, the titanium content in ppm refers to a number of units by mass of titanium with respect to million units of mass of the total positive electrode active material, and a zirconium content in ppm refers to a number of units by mass of zirconium with respect to million units of mass of the total positive electrode active material.

According to an embodiment, a ratio of a magnesium content to a cobalt content (the number of moles of magnesium/the number of moles of cobalt) included in the lithium-deficient cobalt oxide may be greater than the ratio of a magnesium content to a cobalt content in the lithium cobalt-based oxide particle. Such a distribution of magnesium content is observed as the magnesium in the lithium cobalt-based oxide particle migrates due to Mg—Ti Kirkendall effect.

FIG. 1A schematically shows the structure of a composite positive electrode active material according to an embodiment.

Referring to FIG. 1A, a composite positive electrode active material 10 may include a particle coating portion 12 and a surface coating portion 13 on at least one surface, that is, a first surface 17*a* of a lithium cobalt-based oxide particle 11, and the particle coating portion 12 and the surface coating portion 13 may have a layered structure.

Figure 1B:
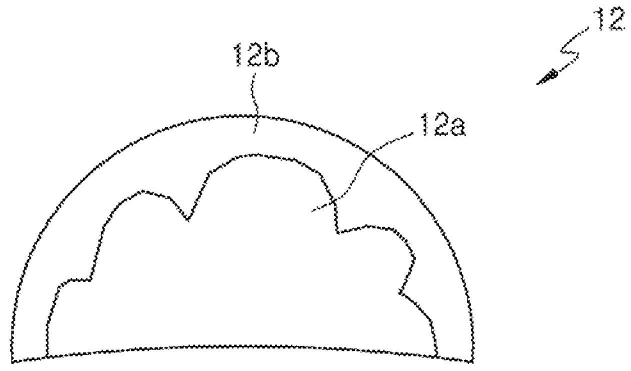
FIG. 1B is an expanded view of a particle coating portion of FIG. 1A.

As shown in FIG. 1B, the particle coating portion 12 contains a first coating layer 12*a* positioned in contact with the lithium cobalt-based oxide particle, and a second coating layer 12*b* disposed on the first coating layer 12*a*. The first coating layer may contain a lithium titanium-based oxide, and the coating layer may contain a lithium zirconium-based oxide.

A lithium-deficient cobalt oxide phase 14 may be present below the particle coating portion 12.

In FIG. 1A, the particle coating portion 12 has a semi-circular shape, but is not limited to such a shape. The surface resistance of the composite positive electrode active material may be lowered and improved further when the particle coating portion 12 exists in an island form, than when the particle coating portion 12 is in a continuous form. The particle coating portion may have a size of about 3.0 micrometers (μm) or less, for example, about 0.5 μm to about 3.0 μm, about 1.0 μm to about 2.5 μm, or about 1.5 μm to about 2.0 μm. Here, the size of the particle coating portion represents a major axis length thereof, and can be measured by scanning electron microscopy or transmission electron microscopy.

The surface coating portion 13 may be in a second inner region that is in contact with the second surface 17*b* of the lithium cobalt-based oxide particle 11. The surface coating portion 13 may contain a third coating layer having a spinel crystal structure. When the surface coating portion is present, high-temperature lifetime characteristics of the composite positive electrode active material may be improved.

The lithium-deficient cobalt oxide phase 14, which is in a lithium-deficient state with a molar ratio of lithium to cobalt of about 0.9 or less, about 0.1 to about 0.9, about 0.3 to about 0.9, about 0.3 to about 0.7, or about 0.3 to about 0.5, and is located in the first inner region contacting the particle coating portion 12 in the lithium cobalt-based oxide particle 11, may be included. The lithium-deficient cobalt oxide phase 14 may be located in a region within about 1.3 μm or less, about 1 μm or less, about 900 nm or less, about 800 nm or less, about 500 nm or less, about 100 nm or less, about 100 nm to about 10 nm, or about 100 nm to about 30 nm, from an outer surface (i.e., a third surface) of the lithium cobalt-based oxide particle, or the lithium-deficient cobalt oxide phase 14 may be located in a region that corresponds to a distance of about 90 (percent) % to about 100%, about 91% to about 99%, or about 92% to about 98%, of the radius of the lithium cobalt-based oxide particle from the particle center. The presence of the lithium-deficient cobalt oxide phase 14 may be confirmed by SEM and/or TEM analyses.

In this specification, the first surface 17*a* indicates a surface of the lithium cobalt-based oxide particle 11 on which the particle coating portion 12 is formed as shown in FIG. 1A. Further, the second surface 17*b* refers to another surface of the lithium cobalt-based oxide 11 on which the surface coating portion 13 is formed, and the third surface 17*c* refers to yet another surface of the lithium cobalt-based oxide particle 11, which is in contact with the particle coating portion 12 and at which the lithium-deficient cobalt oxide phase 14 is located.

Figure 1C:
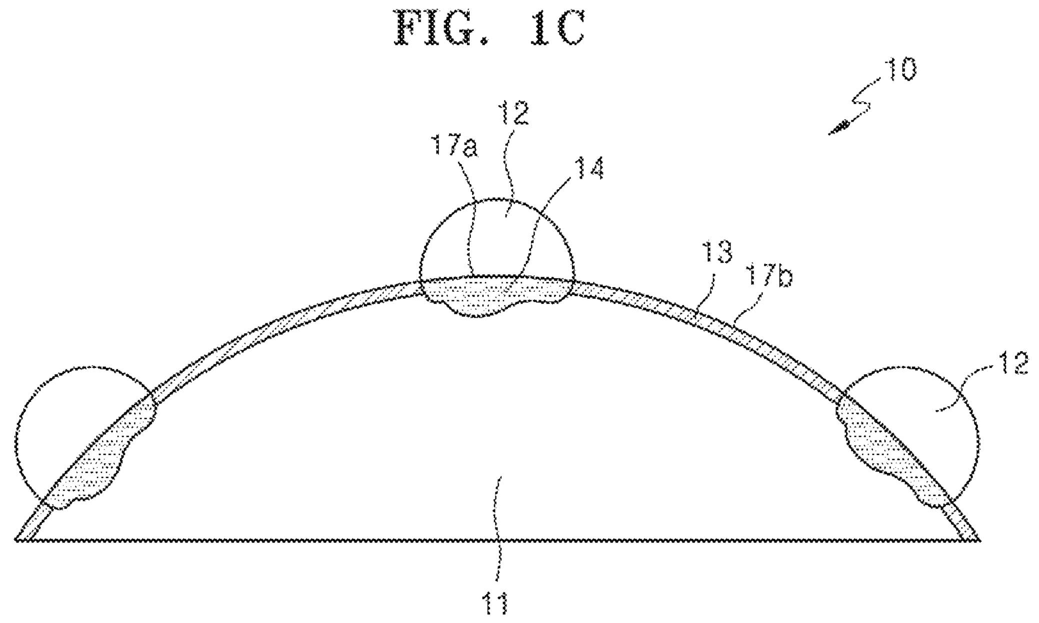
FIG. 1C is a schematic view of another embodiment of a structure of a composite positive electrode active material.

FIG. 1A illustrates a total surface of the lithium cobalt-based oxide particle as being composed of the first surface 17*a*, the second surface 17*b*, and the third surface 17*c*. Alternatively, as shown in FIG. 1C, the total surface of the lithium cobalt-based oxide particle may be composed of the first surface 17*a* and the second surface 17*b*, without the third surface. That is, the total surface of the lithium cobalt-based oxide particle may be composed of the first surface and the second surface, or may be composed of the first surface, the second surface, and the third surface. The first surface may be on a first inner region of the lithium cobalt-based oxide particle, and the second surface may be on a second inner region of the lithium cobalt-based oxide particle. In addition, the third surface may be on the first inner region as illustrated in FIG. 1A.

In the composite positive electrode active material according to an embodiment, the lithium-deficient cobalt oxide phase may have a spinel structure and may be isostructural with $Co_3O_4$, have a spinel phase, and may by in space group Fd-3m). Further, the amount of lithium-deficient cobalt oxide contained in the lithium-deficient cobalt oxide phase may be about 0.1 part by weight to about 1 part by weight, about 0.2 part by weight to about 0.9 part by weight, about 0.3 part by weight to about 0.8 part by weight, with respect to 100 parts by weight of the lithium cobalt-based oxide particle.

Specific examples of the lithium-deficient cobalt oxide may include a compound represented by Formula 5, a compound represented by Formula 5-1, a compound represented by Formula 5-2, or a combination thereof.

$$Li_{1-\alpha}Mg_{a}Co_{1-x}M_{x}O_{2} \quad \text{Formula 5}$$

In Formula 5, M is W, Mo, Zr, Ti, Mg, Ta, Al, Fe, V, Cr, Ba, Ca, Nb, or a combination thereof, and $0.01 \leq \alpha \leq 0.5$, $0 \leq a \leq 0.05$, and $0 \leq x \leq 0.05$, or $0.1 \leq \alpha \leq 0.5$, $0 < a \leq 0.05$, and $0 \leq x \leq 0.05$, $$Li_{1-\alpha}Mg_{a}Co_{2-x}M_{x}O_{4} \quad \text{Formula 5-1}$$

In Formula 5-1, M is W, Mo, Zr, Ti, Mg, Ta, Al, Fe, V, Cr, Ba, Ca, Nb, or a combination thereof, and $0.01 \leq \alpha \leq 0.5$, $0 \leq a \leq 0.05$, and $0 \leq x \leq 0.05$, or $0.1 \leq \alpha \leq 0.5$, $0 < a \leq 0.05$, and $0 \leq x \leq 0.05$, or $$Co_{3-x}M_{x}O_{4} \quad \text{Formula 5-2}$$

In Formula 5-2, M is W, Mo, Zr, Ti, Mg, Ta, Al, Fe, V, Cr, Ba, Ca, Nb, or a combination thereof, and $0 \leq x \leq 0.05$.

The lithium-deficient cobalt oxide phase may include, for example, $Li_{0.95}CoO_2$, $Li_{0.95}Co_2O_4$, $Li_{0.8}Mg_{0.007}CoO_2$, or a combination thereof.

For example, the particle coating portion 12 may have a thickness of about 100 nanometers (nm) to about 500 nm, about 150 nm to about 450 nm, or about 200 nm to about 400 nm.

According to an embodiment, the particle coating portion 12 may include a first coating layer.

According to another embodiment, as illustrated in FIG. 1B, the particle coating portion 12 may have a structure in which a second coating layer 12*b* is located on a first coating layer 12*a*, and a boundary between the first coating layer 12*a* and the second coating layer 12*b* may be formed unevenly. The boundary between the first coating layer 12*a* and the second coating layer 12*b* is uneven according to FIG. 1B, but may be evenly formed in some cases.

A thickness of the first coating layer 12*a* and the second coating layer 12*b* may vary, but for example, the thickness of the first coating layer 12*a* may be greater than the thickness of the second coating layer 12*b*. The thickness of the first coating layer 12*a* may be from about 100 nm to about 500 nm, about 150 nm to about 450 nm, or about 200 nm to about 400 nm, and the thickness of the second coating layer 12*b* may be from about 100 nm to about 300 nm, about 150 nm to about 250 nm, or about 180 nm to about 220 nm. When the thicknesses of the first coating layer and the second coating layer are within the above ranges, the composite positive electrode active material with improved surface resistance can be obtained.

The surface coating portion 13 may contain a third coating layer having a spinel crystal structure. Here, the thickness of the third coating layer may be about 100 nm or less, and for example, may be about 10 nm to about 100 nm. For example, the third coating layer may contain a lithium cobalt-based oxide A (e.g., lithium cobalt oxide, such as $LiCo_2O_4$).

In this specification, a "thickness" of the particle coating portion refers to a distance in a direction from an outer surface of the lithium cobalt oxide particle to an outer surface of the particle coating portion. A thickness of the first coating layer refers to a distance in a direction from an outer surface of the lithium cobalt oxide particle to an outer surface of first coating layer. A thickness of the second coating layer refers to a distance from an outer surface of the first coating layer to an outer surface of the particle coating portion. A thickness of the third coating layer refers to a distance from an outer surface of the first coating layer to an inner surface of the third coating layer. Thickness can be determined by SEM or TEM analysis of a cross-section of a particle. Thickness may be determined by an average distance if the coating layer has an uneven thickness.

A content of a lithium titanium-based oxide in the particle coating portion may be about 0.05 part by weight to about 1.0 part by weight, with respect to 100 parts by weight of the lithium cobalt-based oxide, and a content of a lithium zirconium-based oxide may be about 0.05 part by weight to about 0.2 part by weight, with respect to 100 parts by weight of the lithium cobalt-based oxide. When the contents of the lithium titanium-based oxide and the lithium zirconium-based oxide are within the above ranges, the diffusion coefficient of lithium ions increases and electrical conductivity increases, thus making it possible to prepare a composite positive electrode active material which has a stabilized structure and in which side reactions with electrolyte solution are inhibited and cobalt elution is inhibited.

A content of a lithium cobalt-based oxide A in the third coating layer of the surface coating portion may be about 0.01 part by weight to about 1 part by weight, with respect to 100 parts by weight of the lithium cobalt-based oxide. The lithium cobalt-based oxide A may be $LiCo_2O_4$, and when the content of lithium cobalt-based oxide A is within the above range, a composite positive electrode active material having improved electrical conductivity may be obtained.

When the content of the lithium titanium-based oxide of the first coating layer and the lithium zirconium-based oxide of the second coating layer in the particle coating portion, and the content of the lithium cobalt-based oxide A in the surface coating portion are within the above ranges, the diffusion coefficient of lithium ions increases and electrical conductivity increases, thus making it possible to prepare a composite positive electrode active material having a stabilized structure and inhibited side reactions with electrolyte solution.

Examples of the lithium titanium-based oxide in the first coating layer include a compound represented by Formula 1.

$$Li_{2+a}Ti_{(1-x-y)}Co_xMg_yO_3 \quad \text{Formula 1}$$

In Formula 1, $-0.1 \leq a \leq 0.1$, $0<x \leq 0.5$, and $0<y \leq 0.1$.

In Formula 1, x may be, for example, about 0.01 to about 0.3, about 0.01 to about 0.2, about 0.01 to about 0.1, or about 0.01 to about 0.05, and y may be, for example, about 0.01 to about 0.08, about 0.01 to about 0.05, or about 0.01 to about 0.03.

Examples of the lithium titanium-based oxide include $Li_2Ti_{0.97}Co_{0.02}Mg_{0.01}O_3$.

Examples of the lithium zirconium-based oxide of the second coating layer include a compound represented by Formula 2.

$$Li_{2+a}Zr_{(1-x-z)}Co_zM2_xO_3 \quad \text{Formula 2}$$

In Formula 2, M2 is boron (B), magnesium (Mg), calcium (Ca), strontium (Sr), barium (Ba), titanium (Ti), vanadium (V), chromium (Cr), iron (Fe), copper (Cu), aluminum (Al), or a combination thereof, and $-0.1 \leq a \leq 0.1$, $0 \leq x<1$, and $0 \leq z \leq 0.1$.

In Formula 2, z may be about 0.01 to about 0.1, about 0.01 to about 0.08, or about 0.01 to about 0.05.

Examples of the lithium zirconium-based oxide include $Li_2Zr_{0.99}Co_{0.01}O_3$.

The lithium cobalt-based oxide may have a rhombohedral layered structure, and may be in space group R-3m. Further, examples of the lithium cobalt-based oxide include a compound represented by Formula 3.

$$Li_{a-b}Mg_bCo_{(1-x-y-b)}Al_xM3_yO_2 \quad \text{Formula 3}$$

In Formula 3, $0.9 \leq a \leq 1.1$, $0 \leq b \leq 0.02$, $0 \leq x \leq 0.04$, and $0 \leq y \leq 0.01$, and M3 is Ni, K, Na, Ca, Mg, Si, Fe, Cu, Zn, Ti, Sn, V, Ge, Ga, B, P, Se, Bi, As, Zr, Mn, Cr, Ge, Sr, V, Sc, Y, or a combination thereof.

Examples of the lithium cobalt-based oxide include a compound represented by Formula 4.

$$Li_{a-b}Mg_bCo_{(1-x-b)}Al_xO_2 \quad \text{Formula 4}$$

In Formula 4, $0.9 \leq a \leq 1.1$, $0.001 \leq b \leq 0.01$, and $0.01<x \leq 0.03$.

In Formula 4, a may be about 0.9 to about 1.05, for example.

In Formulas 3 and 4, x and b may be $0.015<x \leq 0.03$ and $0.005 \leq b \leq 0.01$.

In the composite positive electrode active material according to an embodiment, the total thickness of the first coating layer and the second coating layer may be about 500 nm to about 800 nm, and the thickness of the third coating layer may be about 100 nm or less, for example, about 10 nm to about 50 nm.

The second coating layer may be located on the first coating layer, and the boundary surface between the first coating layer and the second coating layer may be even or uneven.

In the composite positive electrode active material according to an embodiment, the ratio of a major axis length of the first coating layer and a major axis length of the second coating layer may be about 1.1 to about 1.5. Here, the ratio of the major axis lengths may be obtained through scanning electron microscopy (SEM) or transmission electron microscopy (TEM) analysis.

The lithium cobalt-based oxide may be, for example, a small particle, a large particle, or a mixture thereof.

In particular, the large particle may have a size of about 10 micrometers (μm) to about 20 μm, and the small particle may have a size of about 3 μm to about 6 μm. In addition, in the mixture of the large particle and the small particle, the weight ratio of the large particle and the small particle may be about 7:3 to about 9:1, or about 8:2 to about 9:1, for example, about 5:1 to about 7:1. When the weight ratio of the large particle and the small particle is within the above ranges, high-temperature lifetime characteristics and high-temperature storage properties of the lithium secondary battery may be improved.

The large particle may have a size of about 10 μm to about 20 μm, or about 17 μm to about 20 μm, for example, about 18 μm to about 20 μm. The small particles may have a size of about 3 μm to about 6 μm, for example, about 3 μm to about 5 μm, or about 3 μm to about 4 μm.

As used in the present application, a particle size refers to a particle diameter if the particle is spherical, and refers to a major axis length of a particle if the particle is non-spherical, such as plate shape and needle-like particle. Here, a particle size refers to an average particle diameter or an average major axis length.

The particle diameter may be, for example, an average particle diameter, and the major axis length may be, for example, an average major axis length. The average particle diameter and the average major axis length refer to an average value of measured particle diameters, and an average value of measured major axis lengths, respectively.

The particle size may be identified using a particle size analyzer, a scanning electron microscope, or a transmission electron microscope. For example, the average particle diameter may be the average particle diameter observed by scanning electron microscopy (SEM). The average particle diameter may be calculated as an average value of particle diameters of approximately 10 particles to approximately 30 particles, using a SEM image.

For example, the average particle diameter may be a median particle size or a D50 particle size. D50, unless otherwise specified in this specification, refers to an average particle diameter of particles having a cumulative volume of 50 volume percent (vol %) in a particle distribution, and on a distribution curve obtained by accumulating particles from the smallest particle size to the largest particle size where the total number of particles is assumed to be 100 percent (%), D50 refers to the value of a particle diameter at 50% counted from the smallest particle. Average particle diameter (D50) may be measured by any suitable method known to a person skilled in the art and may be measured for example, by a particle size analyzer (e.g., HORIBA, LA-950 laser particle size analyzer) or may be measured from a TEM or SEM photograph. Alternatively, after measurement using a measurement device using dynamic light-scattering, the number of particles in each particle size range may be counted by data analysis, and an average particle diameter (D50) value can be easily obtained therefrom through calculation.

According to an embodiment, the composite positive electrode active material may have a layered crystal structure and a specific surface area of about 0.1 square meters per gram ($m^2/g$) to about 3 $m^2/g$, about 0.5 $m^2/g$ to about 2.5 $m^2/g$, or about 1 $m^2/g$ to about 2 $m^2/g$. The specific surface area is the BET specific surface area measured by the nitrogen adsorption method.

According to another aspect, provided is lithium secondary battery including: a positive electrode including the above-described composite positive electrode active material; a negative electrode; and an electrolyte between the positive electrode and the negative electrode.

Hereinbelow, a method of preparing a composite positive electrode active material according to an embodiment is described.

First, the method of preparing a large-particle lithium cobalt-based oxide and a small-particle lithium cobalt-based oxide used in the preparation of composite positive electrode active material is as follows.

Apart from the above, for preparing the large-particle lithium cobalt-based oxide, a first mixture may be prepared by mixing a cobalt precursor having a size of about 4 μm to about 7 μm, a lithium precursor, and a metal precursor.

In particular, a precursor mixture may be obtained by stoichiometrically controlling the ratio of the lithium precursor, the cobalt precursor, and the metal precursor so as to yield a lithium cobalt-based oxide represented by Formula 3.

$$Li_{a-b}Mg_bCo_{(1-x-y-b)}Al_xM3_yO_2 \qquad \text{Formula 3}$$

In Formula 3, $0.9 \le a \le 1.1$, $0 \le b \le 0.02$, $0 \le x \le 0.04$, and $0 \le y \le 0.01$, and M3 is Ni, K, Na, Ca, Mg, Si, Fe, Cu, Zn, Ti, Sn, V, Ge, Ga, B, P, Se, Bi, As, Zr, Mn, Cr, Ge, Sr, V, Sc, Y, or a combination thereof.

The metal precursor may be a magnesium precursor, an aluminum precursor, an M3 precursor, or a combination thereof.

For the lithium precursor, a lithium hydroxide (LiOH), a lithium carbonate ($Li_2CO_3$), a lithium chloride, a lithium sulfate ($Li_2SO_4$), a lithium nitrate ($LiNO_3$), or a combination thereof, may be used.

For the cobalt precursor, a cobalt carbonate, a cobalt oxide, a cobalt chloride, a cobalt sulfate, a cobalt nitrate, or a combination thereof, may be used.

For the aluminum precursor, an aluminum sulfate, an aluminum chloride, an aluminum hydroxide, or a combination thereof, may be used. For the magnesium precursor, a magnesium sulfate, a magnesium chloride, a magnesium hydroxide, or a combination thereof, may be used.

The M3 precursor may be a chloride, a sulfate, a hydroxide, an oxide, or a combination thereof, each of which contains M3 in Formula 3.

The mixing may be carried out by dry mixing, such as mechanical mixing, by using a ball mill, a Banbury mixer, a homogenizer, a Henschel mixer, or a combination thereof. Dry mixing may reduce the production cost compared to wet mixing.

The cobalt precursor used in the preparation of the first mixture may have a size of about 4 μm to about 6.0 μm, for example. When the size of the cobalt precursor is less than about 4 μm or exceeds about 7 μm, preparing a large-particle lithium cobalt-based oxide having a desired size may become difficult.

Further, the large-particle lithium cobalt-based oxide may be obtained by subjecting the first mixture to a first heat-treatment in air or under an oxygen atmosphere. The first heat-treatment may be carried out at about 800 degrees Celsius (° C.) to about 1,000° C.

The large-particle lithium cobalt-based oxide may have a particle size of about 17 μm to about 21 μm, for example, about 18 μm to about 20 μm, for example, 19 μm.

Apart from the above, for preparing a small-particle lithium cobalt-based oxide, a second mixture may be prepared by mixing a cobalt precursor having a size of about 2 μm to about 3 μm, a lithium precursor, and a metal precursor.

The small-particle lithium cobalt-based oxide may be prepared by subjecting the second mixture to a first heat-treatment. Here, the metal precursor is the same metal precursor described for the preparation of the first mixture.

The small-particle lithium cobalt-based oxide may have a size of about 2 μm to about 8 μm, for example, about 3 μm to about 4 μm.

When the size of the cobalt precursor used in the preparation of the small-particle lithium cobalt-based oxide is less than about 2 μm or exceeds about 3 μm, obtaining a small-particle lithium cobalt-based oxide having a desired size may become difficult.

When preparing the large-particle lithium cobalt-based oxide and the small-particle lithium cobalt-based oxide, the molar ratio of lithium and transition metals may be about 1.01 to about 1.05, for example, about 1.02 to about 1.04.

In the preparation of the large-particle lithium cobalt-based oxide and the small-particle lithium cobalt-based oxide, a temperature elevation rate may be about 4 degrees Celsius per minute (° C./min) to about 6° C./min. When the temperature elevation rate is within the above range, cation mixing may be prevented. If the temperature elevation rate is less than about 4° C./min, improvement of phase stability at high voltages may be negligible.

After mixing the above-described large-particle lithium cobalt-based oxide and small-particle lithium cobalt-based oxide in a weight ratio of about 7:3 to about 1:9, a first precursor mixture may be obtained by adding a titanium precursor and a cobalt hydroxide thereto, and a heat-treatment on the first precursor mixture may be carried out at about 850° C. to about 980° C. to form a heat-treated first precursor mixture.

A content of the cobalt hydroxide may be about 3.5 parts by weight to about 7 parts by weight, about 4 parts by weight to about 6 parts by weight, about 4.5 parts by weight to about 5.5 parts by weight, or about 5 parts by weight.

When the content of the cobalt hydroxide is within the above ranges, a desired lithium-deficient cobalt oxide phase may be formed.

The heat-treatment may comprise heat-treating at about 850° C. to about 980° C., and a temperature elevation rate may be about 2° C./min to about 10° C./min, for example, about 4° C./min to about 6° C./min. When the temperature elevation rate is within the above ranges, growth of a spinel structure in the surface coating portion may be developed.

The heat-treatment may comprise heat-treating in air or under an oxygen atmosphere. Here, the oxygen atmosphere may be formed using oxygen alone, or using oxygen and an inert gas such as nitrogen together.

The heat-treated first precursor mixture according to the above process, and a zirconium precursor may be mixed to produce a second precursor mixture, and a heat-treatment may be performed on the second precursor mixture. The heat-treatment on the second precursor mixture may comprise heat-treating at about 750° C. to about 900° C. Here, a temperature elevation rate may be about 2° C./min to about 10° C./min, and may be, for example, about 4° C./min to about 6° C./min. When the temperature elevation rate is within the above ranges, growth of a spinel structure in the surface coating portion may be developed.

Examples of the titanium precursor may include a titanium oxide, a titanium hydroxide, a titanium chloride, or a combination thereof. A cobalt hydroxide has a higher chemical reactivity compared to that of a cobalt oxide. When the cobalt oxide is used as the cobalt precursor, due to large particle size of the cobalt oxide, it may be only possible to merely form a coating layer in an island form, but the coating layer according to an embodiment may not be formed.

The cobalt hydroxide having an average particle diameter of about 50 nm to about 300 nm, or about 100 nm to about 200 nm, may be used.

A content of the cobalt hydroxide may be about 3.5 parts by weight to about 7 parts by weight, with respect to 100 parts by weight of a lithium cobalt-based oxide particle containing magnesium and aluminum. Also, a content of a zirconium precursor may be about 0.2 part by weight to about 0.54 part by weight, with respect to 100 parts by weight of the lithium cobalt-based oxide particle.

The zirconium precursor may be a zirconium oxide, a zirconium hydroxide, a zirconium chloride, a zirconium sulfate, or a combination thereof.

In the precursor mixtures prior to performing the above-described heat-treatment, the molar ratio of lithium to transition metal may be controlled to be about 0.95 to about 1.2, or about 0.99 to about 1.1. When the molar ratio of lithium to transition metal is within the above ranges, it is possible to prepare a lithium cobalt composite oxide having improved high-voltage phase stability.

In addition to the solid-state reaction method described above, a composite positive electrode active material according to an embodiment may also be prepared by other common preparation methods such as spray pyrolysis.

According to another aspect, a positive electrode including the above-described composite positive electrode active material may be provided.

According to another aspect, a lithium secondary battery including the above-described positive electrode may be provided. A method of preparing the lithium secondary battery is described as follows.

A positive electrode may be provided by the method described below.

A positive electrode active material composition containing a mixture of a composite positive electrode active material according to an embodiment, which is a positive electrode active material, a binder, and a solvent may be prepared. The positive electrode active material composition may further include a conductive material. The positive electrode active material composition may be directly coated on a metal current collector, and the coated metal current collector may be dried to form a positive electrode plate. Alternatively, the positive electrode active material composition may be cast on a separate support, and a film exfoliated from the support may be laminated on a metal current collector to thereby form a positive electrode plate. In the providing of the positive electrode, a first positive electrode active material, which is a positive electrode active material commonly used in lithium secondary batteries, may be further included. As the first positive electrode active material, lithium cobalt oxide, lithium nickel cobalt manganese oxide, lithium nickel cobalt aluminum oxide, lithium iron phosphate, lithium manganese oxide, or a combination thereof, may be further included. However, the first positive electrode active material is not limited thereto and may include any positive electrode active material suitable in the art. For example, the first positive electrode active material may use a compound represented by any of the following formulas: $Li_aA_{1-b}B'_bD_2$ (in the formula, $0.9 \le a \le 1.8$ and $0 \le b \le 0.5$); $Li_aE_{1-b}B'_bO_{2-c}D_c$ (in the formula, $0.9 \le a \le 1.8$, $0 \le b \le 0.5$, and $0 \le c \le 0.05$); $LiE_{2-b}B'_bO_{4-c}D_c$ (in the formula, $0 \le b \le 0.5$ and $0 \le c \le 0.05$); $Li_aNi_{1-b-c}Co_bB'_cD_\alpha$ (in the formula, $0.9 \le a \le 1.8$, $0 \le b \le 0.5$, $0 \le c \le 0.05$, and $0 < \alpha \le 2$); $Li_aNi_{1-b-c}CO_bB'_cO_{2-\alpha}F'_\alpha$ (in the formula, $0.9 \le a \le 1.8$, $0 \le b \le 0.5$, $0 \le c \le 0.05$, and $0 < \alpha < 2$); $Li_aNi_{1-b-c}Mn_bB'_cD_\alpha$ (in the formula, $0.9 \le a \le 1.8$, $0 \le b \le 0.5$, $0 \le c \le 0.05$, and $0 < \alpha \le 2$); $Li_aNi_{1-b-c}Mn_bB'_cO_{2-\alpha}F'_\alpha$ (in the formula, $0.9 \le a \le 1.8$, $0 \le b \le 0.5$, $0 \le c \le 0.05$, and $0 < a < 2$); $Li_aNi_bE_cG_dO_2$ (in the formula, $0.9 \le a \le 1.8$, $0 \le b \le 0.9$, $0 \le c \le 0.5$, and $0.001 \le d \le 0.1$); $Li_aNi_bCo_cMn_dGeO_2$ (in the formula, $0.9 \le a \le 1.8$, $0 \le b \le 0.9$, $0 \le c \le 0.5$, $0 \le d \le 0.5$, and $0.001 \le e \le 0.1$); $Li_aNiG_bO_2$ (in the formula, $0.9 \le a \le 1.8$ and $0.001 \le b \le 0.1$); $Li_aCoG_bO_2$ (in the formula, $0.9 \le a \le 1.8$ and $0.001 \le b \le 0.1$); $Li_aMnG_bO_2$ (in the formula, $0.9 \le a \le 1.8$ and $0.001 \le b \le 0.1$); $Li_aMn_2G_bO_4$ (in the formula, $0.9 \le a \le 1.8$ and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); $LiFePO_4$; or a combination thereof. In the above formulas, A is Ni, Co, Mn, or a combination thereof; B' is Al, Ni, Co, Mn, Cr, Fe, Mg, Sr, V, an rare-earth element, or a combination thereof; D is O, F, S, P, a combination thereof; E is Co, Mn, a combination thereof; F' is F, S, P, a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof.

Examples of the binder in the positive electrode active material composition may include polyvinylidene chloride (PVDF), vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, ethylene-propylene-diene polymer (EPDM), sulfonated EPDM, styrene butadiene rubber (SBR), fluororubber, polyamide-imide, polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, lithium polyacrylate, lithium polymethacrylate, ethylene-propylene-diene monomer (EPDM), sulfonated EPDM, styrene butadiene rubber, various copolymers, or a combination thereof.

Examples of the conductive material may include: graphite such as natural graphite, or artificial graphite; carbonaceous materials such as carbon black, acetylene black, Ketjenblack, channel black, furnace black, lamp black, or summer black; conductive fibers such as carbon nanotubes, carbon fibers, or metal fibers; fluorocarbon; metal powder such as aluminum or nickel powder; conductive whiskers such as zinc oxide, or potassium titanate; conductive metal oxide such as titanium dioxide; conductive material such as polyphenylene derivative, or a combination thereof. A combination comprising at least one of the foregoing may be used.

A content of the conductive material may be about 1 part by weight to about 10 parts by weight, or about 1 part by weight to about 5 parts by weight, with respect to 100 parts by weight of the positive electrode active material. When the content of the conductive material is within the above ranges, the electrode thus obtained therefrom may have excellent conductive properties.

As a non-limiting example of the solvent, N-methylpyrrolidone may be used, and the content of the solvent may be about 20 parts by weight to about 200 parts by weight, with respect to 100 parts by weight of the positive electrode active material. When the content of the solvent is in the above range, a formation of a positive electrode active material layer may be facilitated.

The positive electrode current collector may have a thickness of about 3 μm to about 500 μm. Any suitable positive electrode current collector that has conductivity and does not induce chemical changes to the battery may be used. Examples of the positive electrode current collector may include stainless steel, aluminum, nickel, titanium, calcined carbon, or stainless steel surface-treated with carbon, nickel, titanium, silver, or a combination thereof. Binding strength of the positive active material may be increased by forming minute irregularities on a surface of the current collector. The positive electrode current collector may be used in various forms such as a film, a sheet, a foil, a net, a porous body, a foaming body, or a non-woven fabric.

Also, a pore may be formed within the electrode by further adding a plasticizer to the positive electrode active material composition and/or negative electrode active material composition.

The amounts of the positive electrode active material, the conductive material, the binder, and the solvent are at a level suitably used in lithium batteries. Depending on the intended use and composition of the lithium secondary battery, one or more of the conductive material, the binder, and the solvent can be left out.

The negative electrode can be obtained by almost the same method described for the positive electrode preparation process above, except that a negative electrode active material is used instead of the positive electrode active material.

For the negative electrode active material, carbonaceous material, silicon, silicon oxide, silicon-based alloy, silicon-carbon based material composite, tin, tin-based alloy, tin-carbon composite, metal oxides, or a combination thereof, may be used.

The carbonaceous material may be, for example, a crystalline carbon, an amorphous carbon, or a mixture thereof. Examples of the crystalline carbon may include graphite, including artificial graphite or natural graphite in a shapeless, a plate, a flake, a spherical or a fiber form. Examples of the amorphous carbon may include a soft carbon (low-temperature calcined carbon) or a hard carbon, a mesophase pitch carbonization product, a calcined coke, a graphene, a carbon black, a carbon nanotube, or a carbon fiber, but are not limited thereto and may be any material suitable in the art.

The negative electrode active material may be Si, SiOx ($0<x<2$, i.e., about 0.5 to about 1.5), Sn, $SnO_2$, a silicon-containing metal alloy, or a mixture thereof. For metal capable of forming the silicon-containing metal alloy, Al, Sn, Ag, Fe, Bi, Mg, Zn, in, Ge, Pb, Ti, or a combination thereof, may be used.

The negative electrode active material may include a metal/metalloid alloyable with lithium, an alloy thereof, or an oxide thereof. Examples of the metal/metalloid alloyable with lithium may include Si, Sn, Al, Ge, Pb, Bi, Sb, a Si—Y' alloy (wherein Y' is an alkali metal, an alkaline earth metal, a Group 13 element, a Group 14 element, a transition metal, a rare earth metal, or a combination thereof, but not Si), a Sn—Y alloy (wherein Y is an alkali metal, an alkaline earth metal, a Group 13 element, a Group 14 element, a transition metal, a rare earth metal, or a combination thereof, but not Sn), $MnO_x$ ($0<x\leq 2$), or a combination thereof. Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, or a combination thereof. Examples of oxides of the metal/metalloid alloyable with lithium may include lithium titanium oxide, vanadium oxide, lithium vanadium oxide, $SnO_2$, $SiO_x$ ($0<x<2$), or a combination thereof. "Group" means a group of the Periodic Table of the Elements according to the International Union of Pure and Applied Chemistry ("IUPAC") Group 1-18 group classification system.

For example, the negative electrode active material may include an element of a Group 13 element, a Group 14 element, a Group 15 element in the Periodic Table, or a combination thereof, and in particular, may include Si, Ge, Sn, or a combination thereof.

For a binder in the negative electrode active material composition, a nonaqueous binder, an aqueous binder, or a combination thereof, may be used.

Examples of the nonaqueous binder may include ethylene propylene copolymer, polyacrylonitrile, polystyrene, polyvinyl chloride, carboxylated polyvinyl chloride, polyvinyl fluoride, polyurethane, polytetrafluoroethylene, polyvinylidene fluoride, polyethylene, polypropylene, poly amideimide, polyimide, or a combination thereof.

Examples of the aqueous binder may include styrene-butadiene rubber (SBR), acrylated styrene-butadiene rubber (ABR), acrylonitrile-butadiene rubber, acrylic rubber, butyl rubber, fluororubber, ethylene oxide-containing polymer, polyvinylpyrrolidone, polyepichlorohydrine, polyphosphazene, ethylene propylene diene copolymers, polyvinylpyridine, chlorosulfonated polyethylene, latex, a polyester resin, an acrylic resin, a phenolic resin, an epoxy resin, polyvinyl alcohol, or a combination thereof.

When the aqueous binder is used as a negative electrode binder, a cellulose-based compound may be further used as a thickening agent. The cellulose-based compound may include carboxymethyl cellulose, hydroxypropylmethyl cellulose, methyl cellulose, or a combination thereof, or an alkali metal salt thereof.

For the alkali metal, Na, K, or Li may be used. Such a thickening agent may be used in a content of about 0.1 part by weight to about 3 parts by weight, with respect to 100 parts by weight of the negative electrode active material.

Examples of the conductive material may include carbonaceous material, such as natural graphite, artificial graphite, carbon black, acetylene black, Ketjenblack®, a carbon fiber, or a combination thereof; a metal-based material of a metal powder or a metal fiber including copper, nickel, aluminum, silver, or a combination thereof; a conductive polymer such as a polyphenylene derivative; or a mixture thereof.

For the solvent in the negative electrode active material composition, the same solvent used in the positive electrode active material composition may be used. A content of the solvent may be a level that is suitable in lithium secondary batteries.

The separator may be placed between the positive electrode and the negative electrode, and include an insulating thin film that has high ion conductivity and mechanical strength.

The separator may have a pore diameter of about 0.01 μm to about 10 μm, and generally a thickness of about 5 μm to about 20 μm. Examples of the separator may include a sheet, or a non-woven fabric, formed of an olefin-based polymer such as polyethylene, or polypropylene; or a glass fiber. When a solid polymer electrolyte is used as the electrolyte, the solid polymer electrolyte may act as a separator.

The separator may be a single layer of polyethylene, polypropylene, or polyvinylidene fluoride, or may be a multi-layer film, such as a double-layer separator of polyethylene/polypropylene, a triple-layer separator of polyethylene/polypropylene/polyethylene, or a triple-layer separator of polypropylene/polyethylene/polypropylene.

The lithium salt-containing nonaqueous electrolyte may be composed of a nonaqueous electrolyte and a lithium salt.

For the nonaqueous electrolyte, a nonaqueous electrolyte solution, an organic solid electrolyte, or an inorganic solid electrolyte may be used.

The nonaqueous electrolyte solution may include an organic solvent. The organic solvent may be any organic solvent suitable as an organic solvent in the art. Examples of the organic solvent may include propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, fluoroethylene carbonate, benzonitrile, acetonitrile, tetrahydrofuran, 2-methyltetrahydrofuran, γ-butyrolactone, dioxolane, 4-methyldioxolane, N,N-dimethylformamide, N-dimethylacetamide, dimethyl sulfoxide, dioxane, 1,2-dimethoxyethane, sulfolane, dichloroethane, chlorobenzene, nitrobenzene, diethylene glycol, dimethyl ether, and a combination thereof.

Examples of the organic solid electrolyte may include polyethylene derivative, polyethylene oxide derivative, polypropylene oxide derivative, phosphoric acid ester polymer, polyvinyl alcohol, or a combination thereof.

Examples of the inorganic solid electrolyte may include $Li_3N$, LiI, $Li_5NI_2$, $Li_3N$—LiI—LiOH, $Li_2SiS_3$, $Li_4SiO_4$, $Li_4SiO_4$—LiI—LiOH, $Li_3PO_4$—$Li_2S$—$SiS_2$, or a combination thereof.

The lithium salt is a substance that easily dissolves in the nonaqueous electrolyte, and for example, may include $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (here, x and y are each a natural number), LiCl, LiI, or a mixture thereof. Examples of the nonaqueous electrolyte, for the purpose of improving charge-discharge characteristics, or nonflammability, may include pyridine, triethylphosphite, triethanolamine, cyclic ether, ethylene diamine, n-glyme, hexamethyl phosphoramide, nitrobenzene derivative, sulfur, quinone-imine dye, N-substituted oxazolidinone, N, N-substituted imidazolidine, ethylene glycol dialkyl ether, ammonium salt, pyrrole, 2-methoxy ethanol, aluminum trichloride, or a combination thereof. In some cases, to impart nonflammability, a halogen-containing solvent, such as carbon tetrachloride, or ethylene trifluoride, may be further used. The lithium salt may be preferably used at a concentration of about 0.1 molar (M) to about 2.0 M. When the concentration of the lithium salt is within the above range, the electrolyte has a suitable conductivity and viscosity and thus exhibits excellent electrolyte performance, and lithium ions can migrate effectively.

The lithium secondary battery may include a positive electrode, a negative electrode, and a separator.

The positive electrode, the negative electrode, and the separator described above may be wound or folded, and accommodated in a battery case. Then, the battery case may be injected with an organic electrolyte solution and sealed with a cap assembly, to thereby form a lithium secondary battery. The battery case may be a cylindrical type, a rectangular type, or a thin-film type.

The separator may be disposed between the positive electrode and the negative electrode, to thereby form a battery structure. The battery structure is laminated in a bi-cell structure, and immersed in an organic electrolyte solution, and the resulting product is accommodated and sealed in a pouch, to thereby form a lithium-ion polymer battery.

In addition, a plurality of the battery structures are stacked to form a battery pack, and such a battery pack may be used in any and all devices that desire high capacity and high output. For example, such a battery pack may be used in a laptop computer, a smartphone, or an electric vehicle.

The lithium secondary battery according to an embodiment is described as a rectangular type as an example, but the lithium secondary battery is not limited thereto and can be applied to various forms of batteries, such as a cylindrical type, a pouch type, or a coin type.

Figure 4:
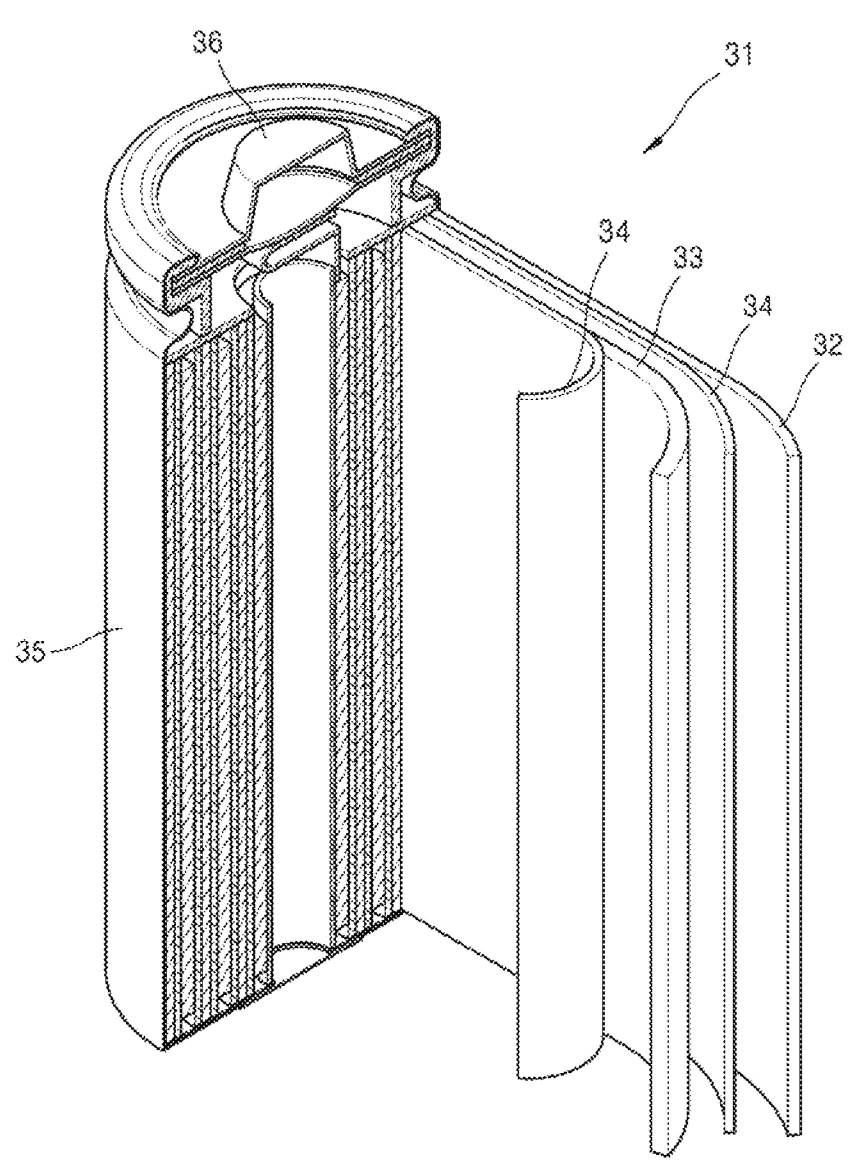
FIG. 4 is a schematic view of an embodiment of a structure of a lithium secondary battery.
Figures 5A, 5B, 5C, 5D, 5E, 5F:
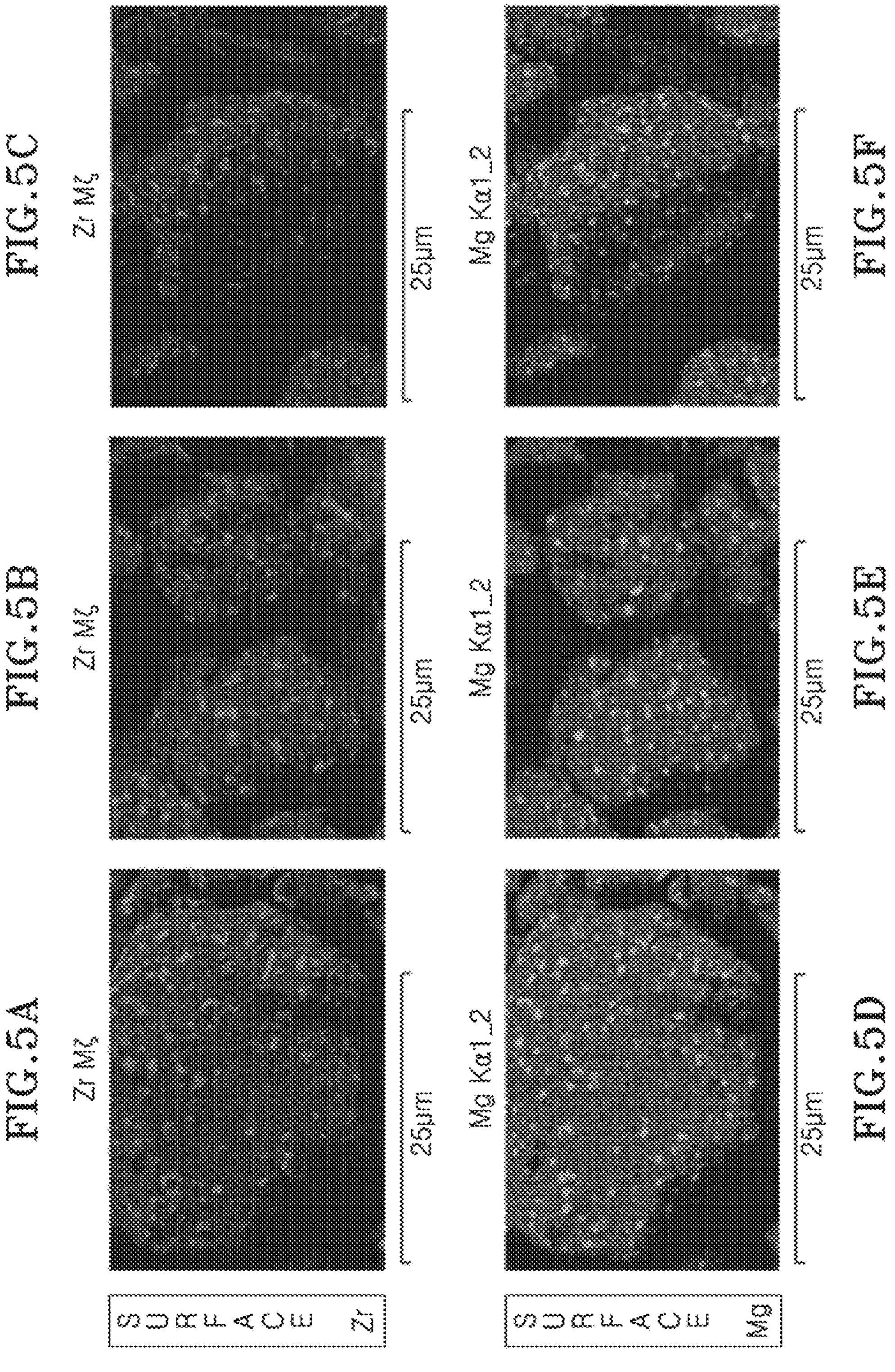
FIGS. 5A to 5F and FIGS. 6A to 6F show the results of SEM-EDS analysis of the composite positive electrode active material prepared according to Example 1.
Figure 6A:
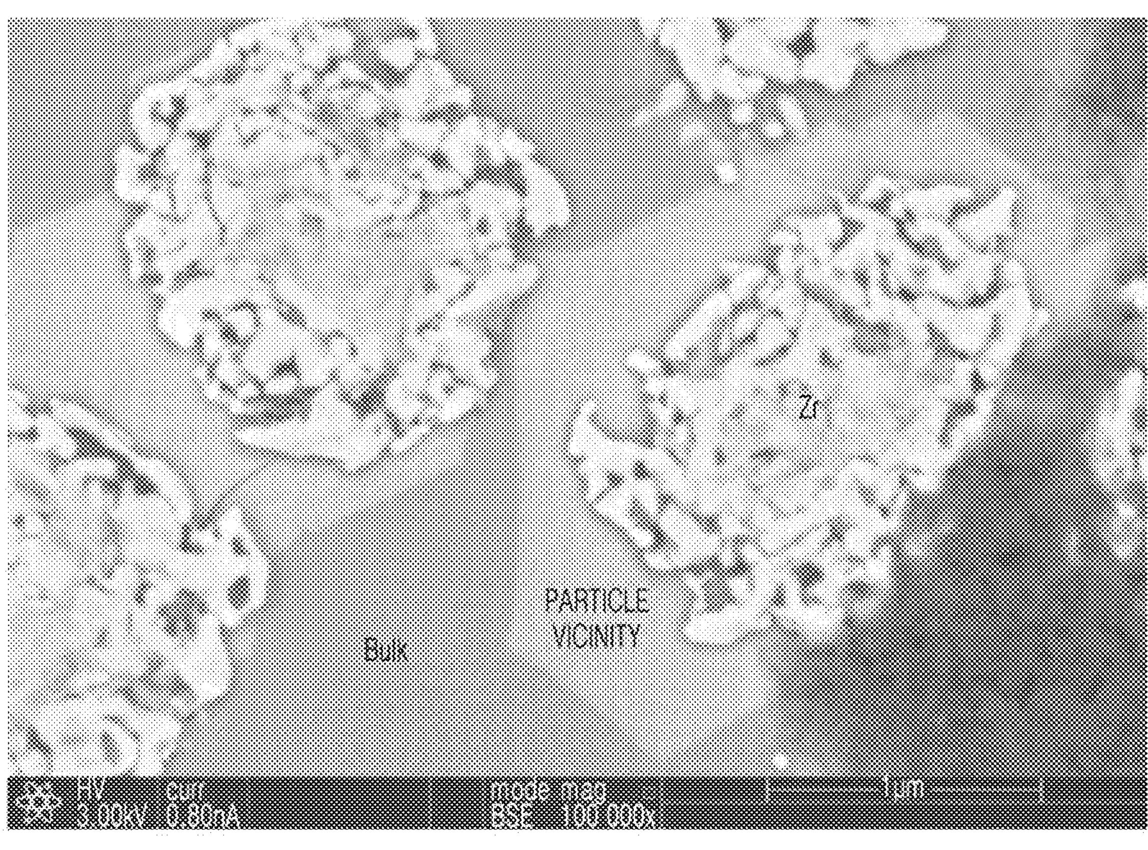
Figure 6B:
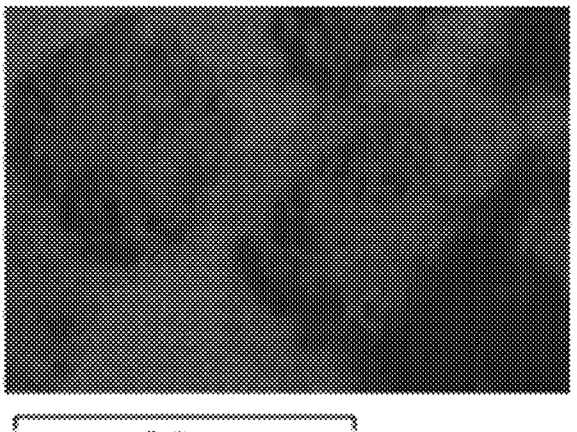
Figure 6C:
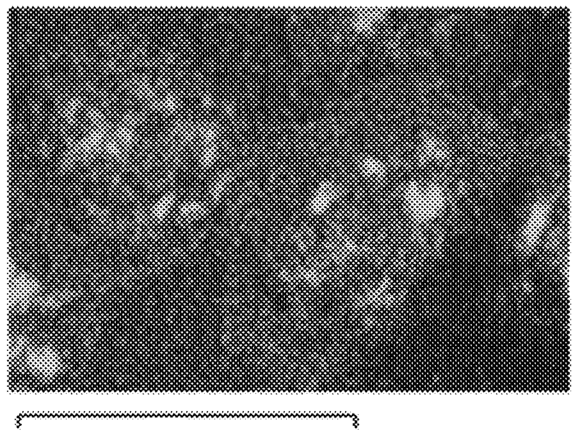
Figure 6D:
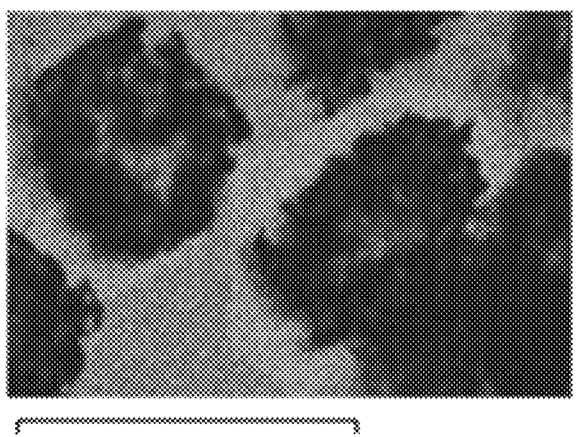
Figure 6E:
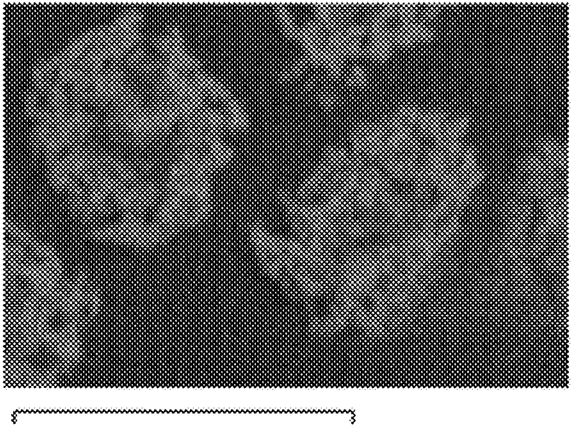
Figure 6F:
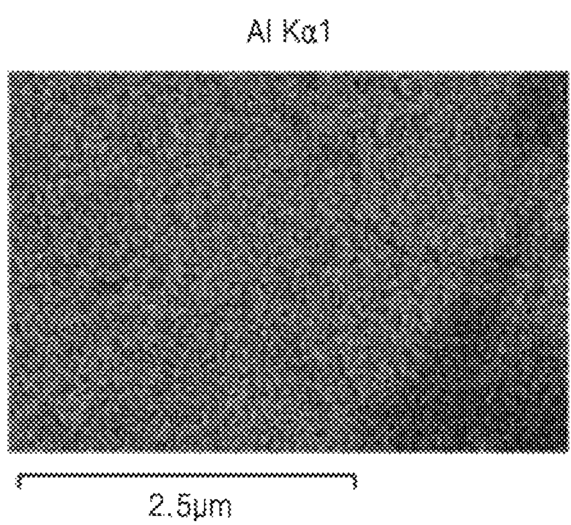

FIG. 4 is a schematic cross-sectional view of a representative structure of a lithium secondary battery according to an embodiment.

As shown in FIG. 4, a lithium secondary battery 31 may include a positive electrode 33, a negative electrode 32, and a separator 34. An electrode assembly having the positive electrode 33, the negative electrode 32, and the separator 34 wound or folded therein may be accommodated in a battery case 35. Depending on the battery shape, the battery structure having an alternating stack of the positive electrode, the negative electrode, and the separator therebetween may be formed. Then, injecting an organic electrolyte solution into the battery case 35 and sealing the same with a cap assembly 86 may complete the preparation of a lithium secondary battery 31. The battery case 35 may be a cylindrical type, a rectangular type, or a thin-film (i.e., film) type. For example, the lithium secondary battery 31 may be a large-size thin-film type battery. The lithium secondary battery may be a lithium ion battery. Having the battery structure accommodated in a pouch, and impregnated with the organic electrolyte solution and sealed, may complete the preparation of a lithium ion polymer battery. In addition, a plurality of the battery structures may be stacked to form a battery pack, and such a battery pack may be used in all types of devices that desire high capacity and high output. For example, such a battery pack may be used in a laptop computer, a smartphone, or an electric vehicle.

The following Examples and Comparative Examples are provided to describe the embodiments in greater detail. However, it will be understood that the Examples are provided only to illustrate the embodiments and not to be construed as limiting the scope of the embodiments.

EXAMPLES

Preparation of Composite Positive Electrode Active Material

Example 1: Mg 1000 ppm, Al 4000 ppm Doped Lithium Cobalt Oxide (LCO)+Ti 700 ppm/Zr 2250 ppm Surface Coating Lithium carbonate, $Co_3O_4$ (D50: 4.5 μm), aluminum hydroxide $Al(OH)_3$, and magnesium carbonate $MgCO_3$, which is a magnesium precursor, were mixed while the amounts of the respective precursors were stoichiometrically controlled so as to yield $Li_{1.025}Mg_{0.005}Co_{0.985}Al_{0.015}O_2$, to produce a first mixture.

The first mixture was heated to 1,088° C. at a temperature elevation rate of 4.5° C./min, and at this temperature under an air atmosphere, the first mixture was subjected to a first heat-treatment for 15 hours, to produce large particles $Li_{1.025}Mg_{0.004}Co_{0.986}Al_{0.014}O_2$, having a layered structure and an average particle diameter (D50) of about 17 μm. Here, the molar ratio of lithium to other metals other than lithium (Li/Me) was 1.025. The other metals other than lithium represent cobalt and aluminum.

Apart from the above, a cobalt precursor $Co_3O_4$ (D50: 2.5 μm), aluminum hydroxide $Al(OH)_3$, lithium carbonate, and magnesium carbonate, which is a magnesium precursor, were mixed to produce a second mixture, and the second mixture was heated to 940° C. at a rate of 4.5° C./min and at this temperature, the second mixture was subjected to a heat-treatment for 5 hours, to produce small particles (D50: 3.5 μm) $Li_{1.025}Mg_{0.005}Co_{0.985}Al_{0.015}O_2$, having a layered structure. Here, the molar ratio of lithium to other metals (Li/Me) was 1.025.

Large particles and small particles obtained from the above process were mixed in a weight ratio of 8:2 and further combined with titanium dioxide and cobalt hydroxide $Co(OH)_2$ (average particle diameter: about 100 nm) to produce a third mixture. The third mixture was subjected to a heat-treatment at about 950° C. Here, the content of the cobalt hydroxide was 5 parts by weight with respect to 100 parts by weight of the large particles or small particles, and the content of the titanium dioxide was stoichiometrically controlled such that titanium was included in about 700 ppm in the composite positive electrode active material.

Subsequently, zirconium oxide was added to the heat-treated product to produce a fourth mixture, and the fourth mixture was subjected to a heat-treatment at about 850° C., to produce a composite positive electrode active material. Here, the content of zirconium oxide was stoichiometrically controlled such that zirconium was doped at about 2,250 ppm in the composite positive electrode active material.

The composite positive electrode active material has a bimodal state containing a large particle and a small particle. Both of the large particle and the small particle have a structure in which a first coating layer is located on a first surface, a second coating layer is located on the first coating layer, a third coating layer is located in a second inner region of the composite positive electrode active material, and a lithium-deficient cobalt phase ($Li_{0.8}Mg_{0.007}CoO_2$) is included in a first inner region and positioned contacting the first coating layer. In particular, the first coating layer contained $Li_2Ti_{0.97}Co_{0.02}Mg_{0.01}O_3$, the second coating layer contained $Li_2Zr_{0.98}Co_{0.02}O_3$, and the third coating layer contained $LiCo_2O_4$.

Example 2: LCO Doped with Mg 1,000 ppm, Al 6,000 ppm+Ti 700 ppm/Zr 4500 ppm Surface Coating A composite positive electrode active material was prepared following the same process described in Example 1, except that large-particle $Li_{1.025}Mg_{0.005}Co_{0.978}Al_{0.022}O_2$ (D50: 17 μm) and small-particle $Li_{1.025}Mg_{0.005}Co_{0.978}Al_{0.022}O_2$(D50: 3.5 μm) were used as the large particle and the small particle, respectively.

Example 3-5

Composite positive electrode active materials were obtained following the same method as Example 1, except that the weight ratio of the large particle and the small particle was changed from 8:2 to 2:8, 1:9, and 9:1.

Comparative Example 1: LCO Doped with Mg 1,000 ppm, Al 4,000 ppm

Large-particle and small-particle positive electrode active materials were obtained following the same process as Example 1, except that when preparing the first mixture and the second mixture, the amounts of the lithium carbonate, $Co_3O_4$, and the magnesium precursor $MgCO_3$ as the magnesium precursor were stoichiometrically controlled so as to yield $Li_{1.025}Mg_{0.005}Co_{0.985}Al_{0.015}$.

The large particle and the small particle obtained from the above process were mixed in a weight ratio of 8:2 and further combined with cobalt hydroxide ($Co(OH)_2$) to produce a third mixture. This third mixture was then subjected to a second heat-treatment at about 900° C. to produce a bimodal composite positive electrode active material containing large-particle $Li_{1.025}Mg_{0.005}Co_{0.985}Al_{0.015}$ (D50: 17 μm) and small-particle $LiMg_{0.005}Co_{0.985}Al_{0.015}$ (D50: 3.5 μm).

Comparative Example 2: LCO Doped with Mg 1,000 ppm, Al 4,000 ppm+Ti 700 ppm Surface Coating The large particle and the small particle obtained according to Example 1 were mixed in a weight ratio of 8:2 and further combined with titanium dioxide and cobalt hydroxide ($Co(OH)_2$) to produce the third mixture. A bimodal composite positive electrode active material was prepared following the same process as Example 1, except that after heat-treating this third mixture at about 950° C., addition of zirconium oxide and heat-treatment were not performed on the heat-treated product.

Preparation of Lithium Secondary Battery

Manufacturing Example 1

By using a mixer to remove air bubbles from a mixture of the positive electrode active material obtained according to Example 1, polyvinylidene fluoride, and carbon black, which is a conductive material, a slurry for forming positive electrode active material layer having the above components evenly distributed was prepared. N-methyl pyrrolidone as a solvent was added to the mixture, and the weight ratio of the composite positive electrode active material, polyvinylidene fluoride, and carbon black was 98:1:1. The slurry prepared from the above process was coated on an aluminum foil using a doctor blade and formed into the shape of a thin electrode plate, and then dried at 135° C. for 3 hours or more, followed by extrusion and vacuum drying, to thereby produce a positive electrode.

A composition for negative electrode active material formation was obtained by mixing natural graphite, carboxymethylcellulose (CMC), and styrene butadiene rubber (SBR), and the composition for forming negative electrode active material layer was coated on a copper current collector, and the coated copper current collector was dried to produce a negative electrode. The weight ratio of the natural graphite, CMC, and SBR was 97.5:1:1.5, and a content of distilled water was about 50 parts by weight with respect to 100 parts by weight of a total weight of the natural graphite, CMC, and SBR combined.

A separator (thickness: about 10 μm) formed of a porous polyethylene (PE) film was placed between the positive electrode and the negative electrode, and an electrolyte solution was injected to thereby form a lithium secondary battery. For the electrolyte solution, a solution containing 1.1M $LiPF_6$ in a solvent obtained by mixing ethylene carbonate (EC), ethyl methyl carbonate (EMC) and dimethyl carbonate (DMC) in a volume ratio of 3:4:3 was used.

Manufacturing Example 2

A lithium secondary battery was prepared following the same procedure described in Manufacturing Example 1, except that when preparing the positive electrode, the positive electrode active material of Example 2 was used instead of the positive electrode active material of Example 1.

Comparative Manufacturing Example 1-2

A lithium secondary battery was prepared following the same procedure described in Manufacturing Example 1, except that when preparing the positive electrode, the positive electrode active material of Comparative Example 1 and Comparative Example 2 was used instead of the positive electrode active material of Example 1.

Evaluation Example 1: Charge-Discharge Characteristics

Lithium secondary batteries prepared in Manufacturing Example 1-2 and Comparative Manufacturing Example 1-2 were charged to 90% SOC at a constant current at 25° C., aged for 48 hours, and were cut-off at a current of 0.05 C rate while maintaining 4.58 V in a constant current/constant voltage mode, followed by discharging at a constant current of 0.5 C rate until the battery voltage reached 3.0 V during discharge (formation process).

Each of the lithium batteries that underwent the above formation process was charged at a constant current of 2.0 C rate until the battery voltage reached 4.55 V. Fully charged cells were rested for about 10 minutes, and then subjected to a constant current discharging at a current of 0.2 C until the cell voltage reached 3 V. The C rate is a discharge rate of a cell, and is obtained by dividing a total capacity of the cell by a total discharge period of time of 1 hour, e.g., a C rate for a battery having a discharge capacity of 1.6 ampere-hours would be 1.6 amperes. The total capacity is determined by a discharge capacity at 1st cycle.

After the charge-discharge process described above, each of the lithium batteries was evaluated for initial charge efficiency according to Equation 1 below, and results of the evaluation are shown in Table 1.

Initial Charge Efficiency (%)=(Discharge capacity (0.2C) at 1st cycle/Charge capacity (0.2C) at 1st cycle)×100% Equation 1

Evaluation Example 2: High Temperature Characteristics

Lithium secondary batteries prepared in Manufacturing Example 1-2 and Comparative Manufacturing Example 1-2 were charged to 90% state of charge (SOC) at a constant current at 45° C., aged for 48 hours, and were cut-off at a current of 0.05 C rate while maintaining 4.58 V in a constant current/constant voltage mode, followed by discharging at a constant current of 0.5 C rate until the battery voltage reached 3.0 V during discharge (formation process, 1st cycle).

Each of the lithium batteries through the 1st cycle of the formation process was charged at a constant current of 0.2 C at 45° C. until the battery voltage reached 4.55 V. Fully charged cells were rested for about 10 minutes and subjected to a constant current discharging at a current of 0.2 C until the cell voltage reached 3 V. Each of the batteries was evaluated after 50 repetitions of the above cycle.

The batteries were evaluated for lifespan characteristics at high temperature according to Equation 2, and the results of evaluation are shown in Table 1.

Lifespan (%)=(Discharge capacity at 50th cycle)/(Discharge capacity at 1st cycle)×100% Equation 2

Evaluation Example 3: Direct-Current Internal Resistance (DC-IR) Test

Lithium secondary batteries prepared in Manufacturing Examples 1 and 2, and Comparative Manufacturing Examples 1 and 2, were charged to 90% SOC at a constant current at 25° C., aged for 48 hours, and were cut-off at a current of 0.05 C rate while maintaining 4.58 V in a constant current/constant voltage mode, followed by discharging at a constant current of 0.5 C rate until the battery voltage reached 3.0 V during discharge (formation process).

Each of the lithium batteries that underwent the above formation process was charged at a constant current of 2.0 C rate until the battery voltage reached 4.55 V. Fully charged cells were rested for about 10 minutes, and then subjected to a constant current discharging at a current of 0.2 C until the cell voltage reached 3 V.

The lithium batteries that underwent the above process were measured for direct current internal resistance (DCIR) and the results are shown in Table 1.

TABLE 1

| Coin cell | Manufacturing Example 1 | Manufacturing Example 2 | Comparison Manufacturing Example 1 | Comparison Manufacturing Example 2 |
|---|---|---|---|---|
| 0.2 C Charge capacity (mAh) | 208.1 | 208.0 | 209.4 | 209.5 |
| 0.2 C Discharge Capacity (mAh) | 192.5 | 192.4 | 195.8 | 195.7 |
| 0.2 C Charge-Discharge Efficiency (%) | 92.5 | 92.5 | 93.5 | 93.4 |
| High-temperature lifetime (%)(@50 cycle) | 63.2 | 71.2 | 52.6 | 47.5 |
| DCIR (mΩ) | 11.0 | 10.5 | 18.3 | 13.2 |

From Table 1, it could be confirmed that the lithium secondary batteries in Manufacturing Examples 1 and 2 have drastically increased lifespan characteristics at high temperature and also improved resistance characteristics compared to the lithium secondary batteries of Comparative Manufacturing Examples 1 and Comparative Manufacturing Example 2.

Evaluation Example 4: HR-TEM (High-Resolution Transmission Electron Microscopy)(I)

Figure 2A:
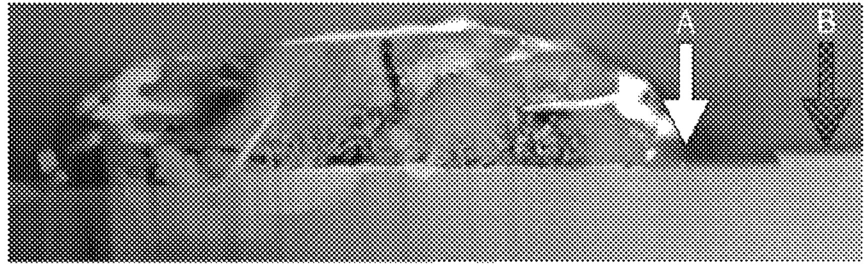
FIG. 2A, shows the results of high-resolution transmission electron microscopy (HR-TEM) analysis of a composite positive electrode active material of Example 1.

HR-TEM analysis was performed on the composite positive electrode active material of Example 1 to investigate crystal structures of the lithium-deficient cobalt oxide phase in the lithium cobalt-based oxide (LCO). The results of analysis are shown in FIGS. 2A, 2B1 to 2B3, and 2C1 to 2C3. FIGS. 2B1 to 2B3 are crystal structure analysis images of the region A indicated with an arrow in FIG. 2A, and FIGS. 2C1 to 2C3 are crystal structure analysis images of the region B indicated with an arrow in FIG. 2A.

In view of the above, it could be confirmed that the coating portion area is composed of multiple crystal particles, and as shown in FIGS. 2B1 to 2B3, epitaxial growth was observed at the interface (FIG. 2B1) with LCO. In FIG. 2B1, the interface is indicted by arrow A. As shown in FIGS. 2C1 to 2C3, this epitaxial growth showed a similar result as rock salt (Fm-3m) phase formed on LCO surface (FIG. 2C1) of uncoated area. The LCO surface is indicated in FIG. 2C1 by Arrow A.

Evaluation Example 5: TEM-EDS Analysis

TEM-EDS analysis was performed on the composite positive electrode active material of Example 1, and the results of analysis are shown in FIGS. 3A to 3H.

Figure 3A:
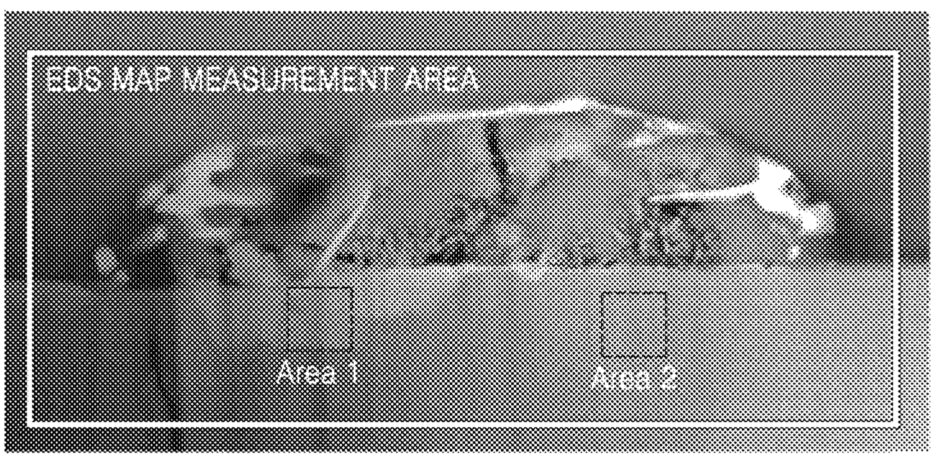
FIGS. 3A to 3F show the results of scanning electron microscopy energy dispersive X-ray spectroscopy (SEM-EDS) analysis of the composite positive electrode active material prepared according to Example 1.
Figure 3B:
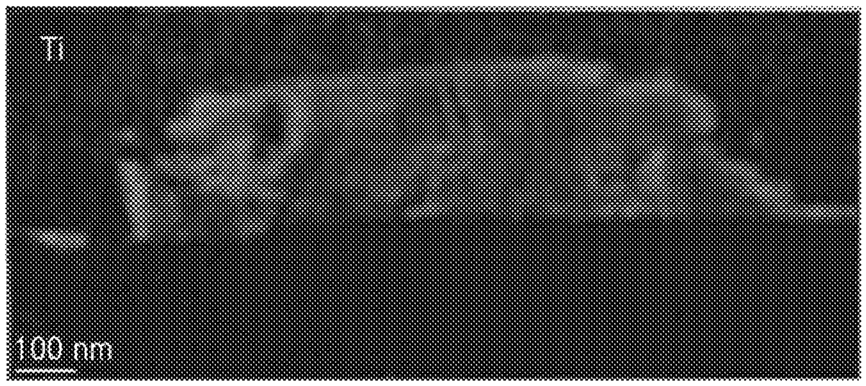

FIG. 3A shows EDS MAP measurement areas, and in FIG. 3A, Area 1 indicates a lithium-deficient cobalt phase area and Area 2 indicates a surface coating portion. FIG. 3B, FIG. 3C, FIG. 3D, FIG. 3E, and FIG. 3F, show mapping images for Ti, Mg, O, Co, and Zr, respectively. FIG. 3G and FIG. 3H show the EDS analysis results for Area 1 and Area 2 in FIG. 3A, respectively.

Figure 3C:
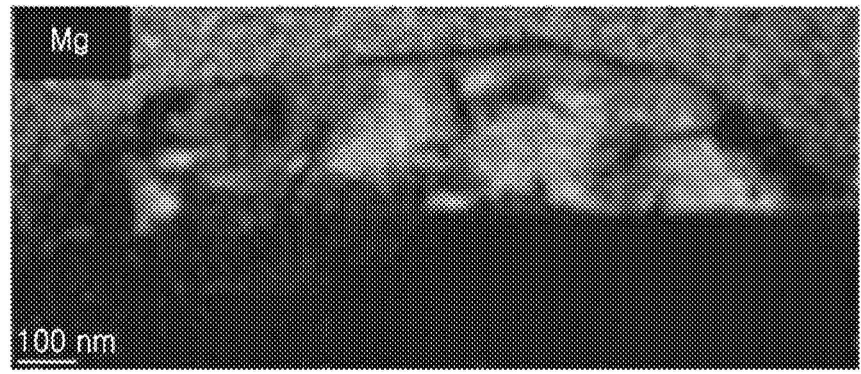
Figure 3D:
Figure 3E:
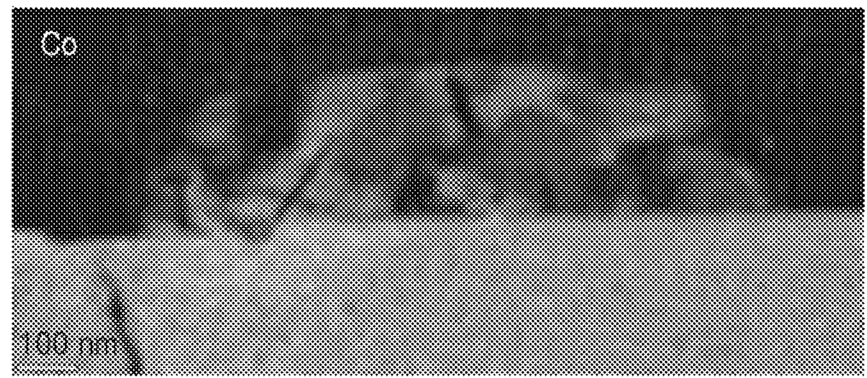
Figure 3F:
Figure 3G:
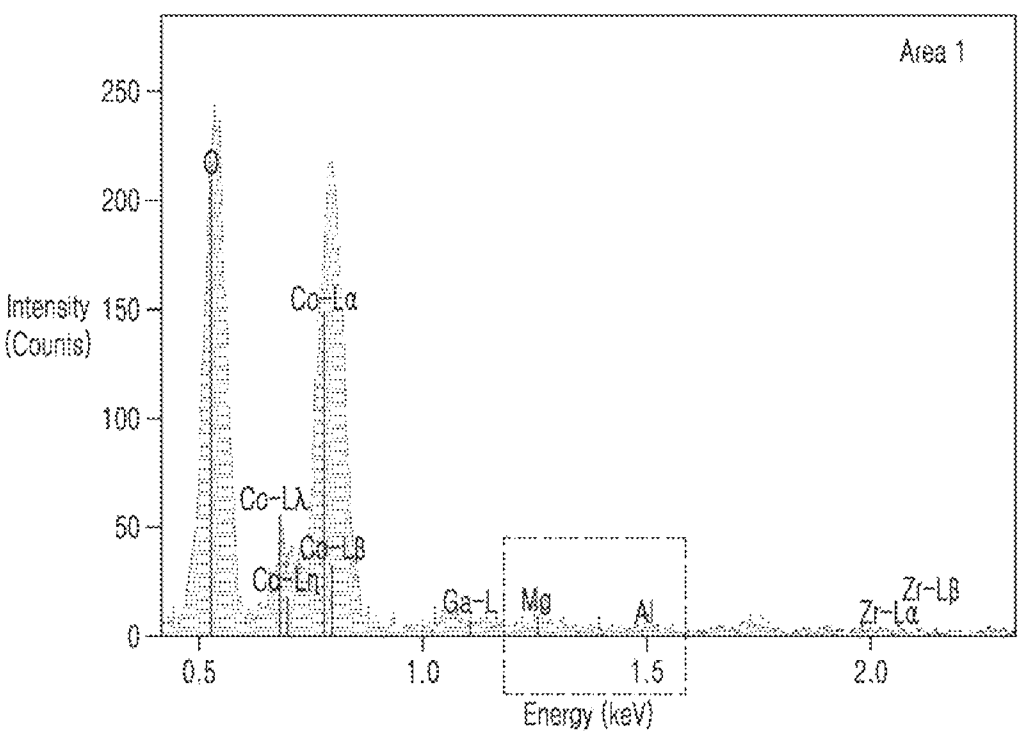
FIGS. 3G and 3H are each a graph of intensity (counts) vs. energy (kiloelectron volts, keV) and show the results of scanning electron microscopy energy dispersive X-ray spectroscopy (SEM-EDS) analysis of the composite positive electrode active material prepared according to Example 1.
Figure 3H:
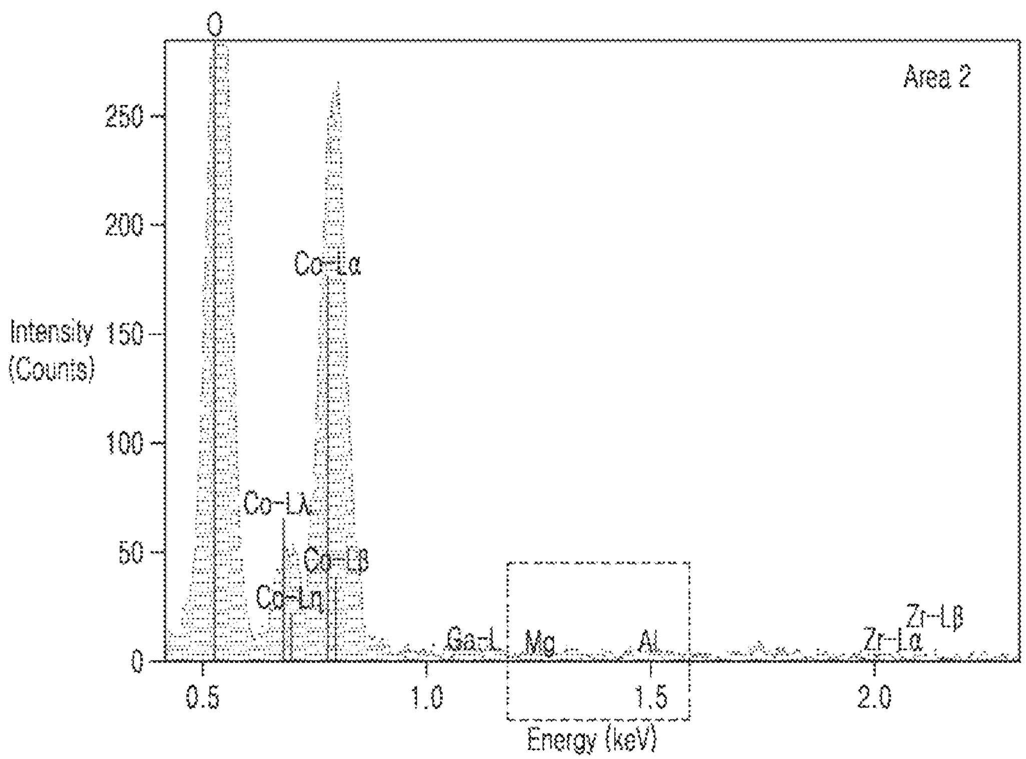

With reference thereto, these results show that the Co component is evenly distributed in the lithium cobalt-based oxide particle area (core area) and the particle coating portion area in composite positive electrode active material (FIG. 3E), and Mg component is shown in the particle coating portion area (FIG. 3C). In addition, the Zr component is shown in the particle coating portion (FIG. 3F), and from FIG. 3D, it could be seen that the oxygen (O) component is evenly distributed in both the core area and the particle coating portion area. From here, it could be observed that Mg, Ti, Zr and Co are in a mixed state in the lithium cobalt-based oxide particle and the distribution of each element is slightly different from one another. In addition, from FIG. 3G and FIG. 3H, it could be seen that Area 1 is a Co- and Mg-rich area compared to Area 2, and in a O- and Al-poor state.

Evaluation Example 6: SEM-EDS Analysis

Scanning electron microscopy-Energy dispersive X-ray spectroscopy (SEM-EDS) analysis was performed on the composite positive electrode active material prepared according to Example 1. Spectra 300 (Thermo Fisher) was used for SEM-EDS analysis.

The SEM-EDS analysis results were shown in FIGS. 5A to 5F and FIGS. 6A to 6F.

Referring to FIGS. 5A to 5F, it could be seen that on the surface of the composite positive electrode active material of Example 1, magnesium was generally evenly distributed and zirconium was present in the particle coating portion area.

Referring to FIGS. 6A to 6F, Zr is observed in the particle coating portion of the composite positive electrode active material of Example 1. Also, it could be seen that the particle coating portion of the composite positive electrode active material of Example 1 contains a high content of cobalt and magnesium and a low content of oxygen.

Evaluation Example 7: SEM and TEM Analyses

SEM and TEM analyses of the composite positive electrode active material of Example 1 were performed.

Figure 7A:
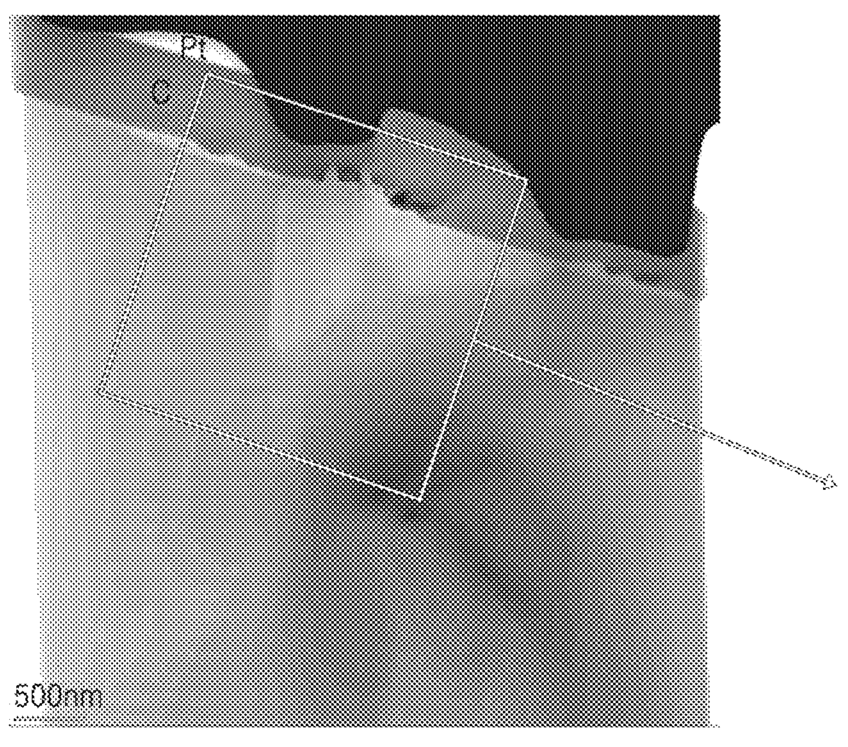
FIGS. 7A and 7B show the results of TEM analysis of the composite positive electrode active material of Example 1.
Figure 7B:
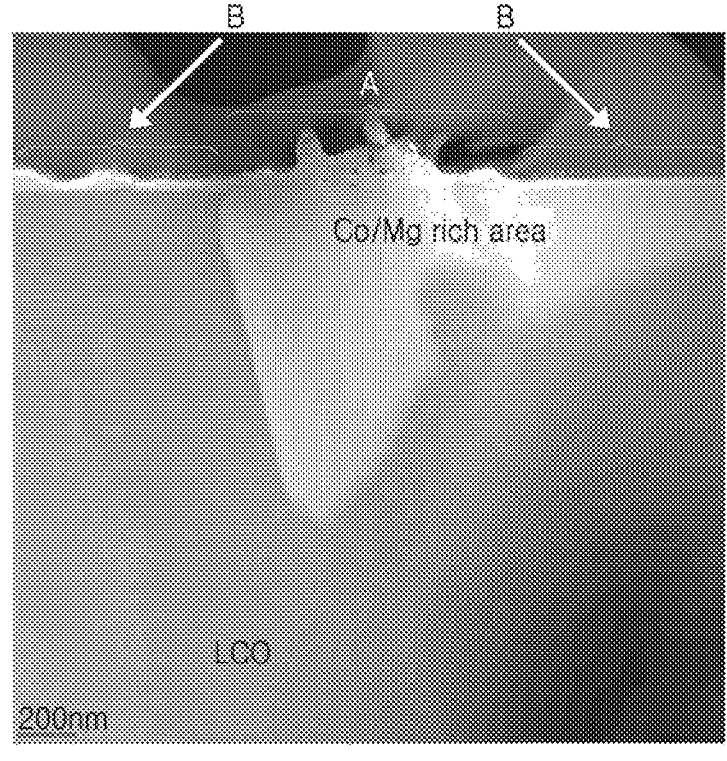
Figure 7C:
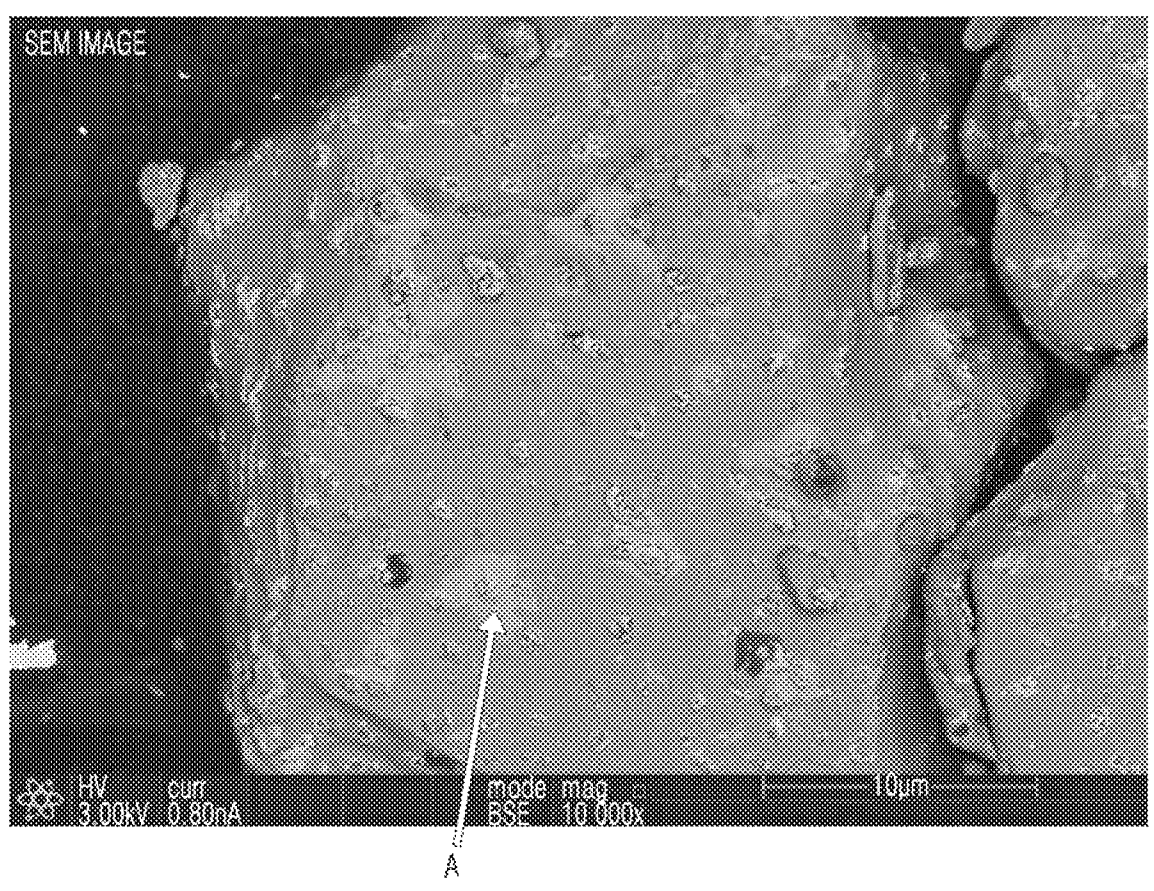
FIG. 7C shows the results of SEM analysis of the composite positive electrode active material of Example 1.

FIGS. 7A and 7B show the TEM analysis results, and FIG. 7B is an expanded view of a lithium-deficient cobalt oxide phase area in FIG. 7A, an area A represents a particle coating portion, and an area B represents a surface coating portion. FIG. 7C shows the SEM analysis results, and an area A indicated with an arrow shows a lithium-deficient cobalt oxide phase area, which is a cobalt/magnesium-rich area.

Figure 7D:
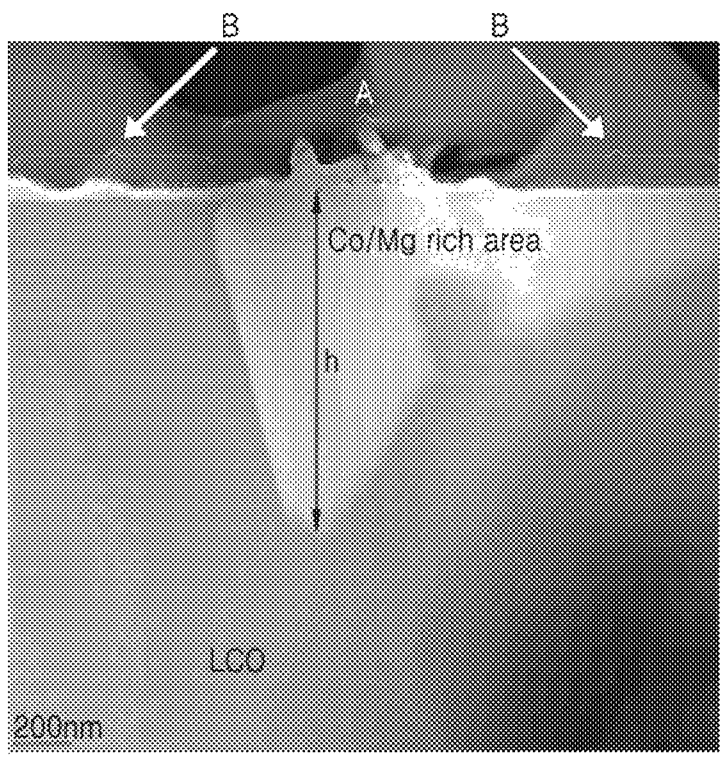
FIG. 7D shows results of TEM analysis of the composite positive electrode active material of Example 1.

FIG. 7D shows a doping depth h, a particle coating portion, and a surface coating portion area. Referring to FIG. 7D, the lithium-deficient cobalt oxide phase area is a cobalt/magnesium-rich area. In addition, the doping depth h of the lithium-deficient cobalt oxide phase is 1 μm or less. In addition, the area A represents a particle coating portion, and the area B represents a surface coating portion.

Figure 8A:
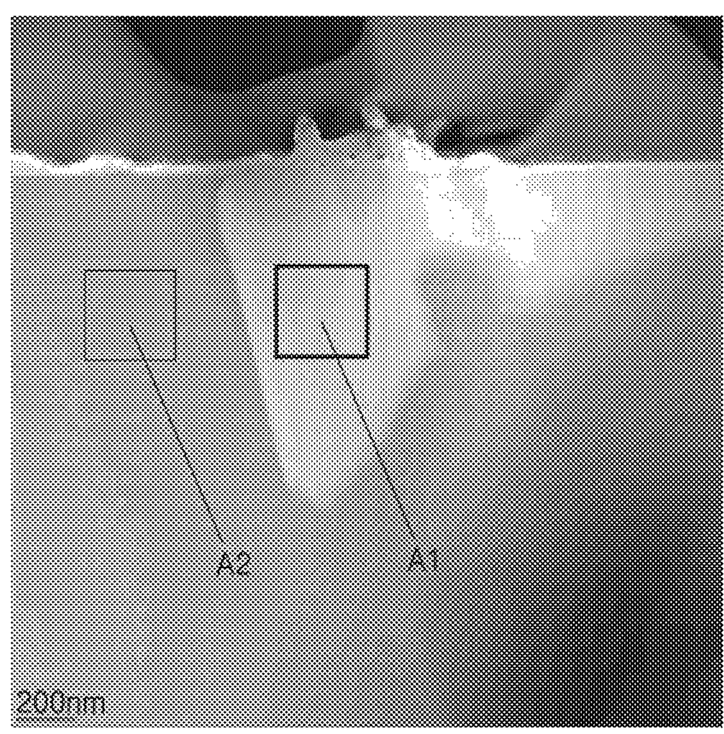
FIG. 8A shows the results of TEM analysis and indicated regions A1 and A2 for a crystal structure analysis using TEM, of the composite positive electrode active material of Example 1.

FIG. 8A is a crystal structure image using TEM, of the composite positive electrode active material of Example 1. FIG. 8B1 shows a TEM image and FIG. 8B2 shows a crystal structure image of the area Al in FIG. 8A, and FIG. 8C1 shows a TEM image and FIG. 8C2 shows a crystal structure image of the area A2 in FIG. 8A.

As shown in FIGS. 8B1 and 8B2, it could be confirmed that the lithium-deficient cobalt oxide present inside the composite positive electrode active material particle has a spinel crystal structure of the space group Fd-3m, and the lithium cobalt-based oxide particle present inside the composite positive electrode active material particle has a layered crystal structure of the space group R3m.

Evaluation Example 8: Conductivity Evaluation

Figure 9A:
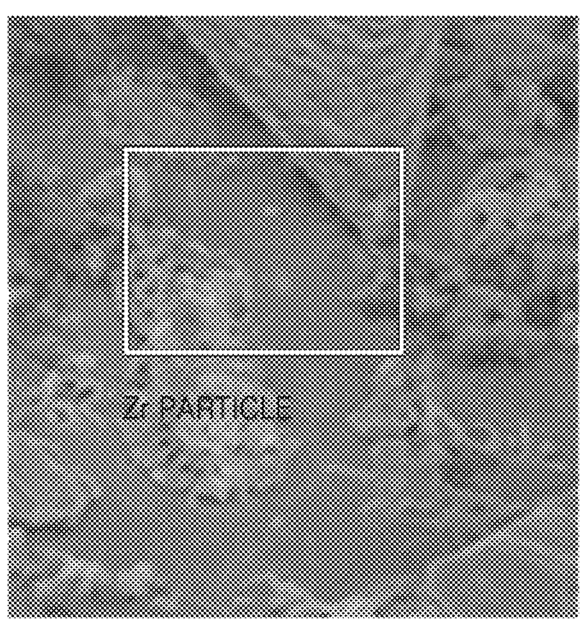
FIGS. 9A and 9B show SEM analysis results for conductivity evaluation of a bulk region, a particle coating portion, and a surface coating portion of a composite positive electrode active material obtained according to Example 1.
Figure 9B:
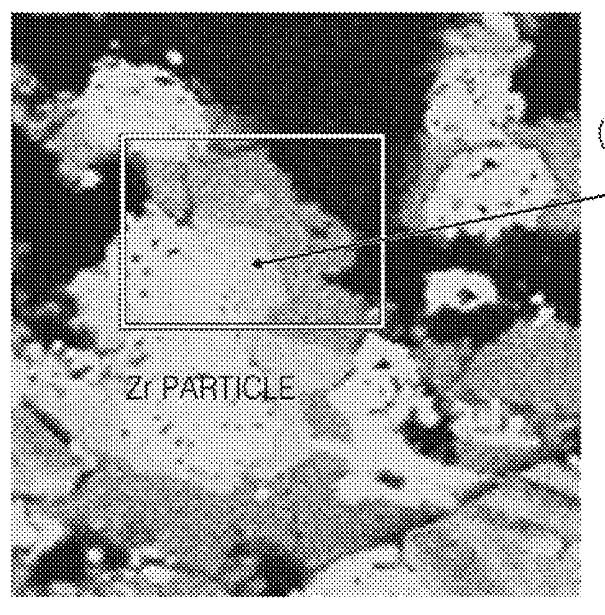
Figure 9C:
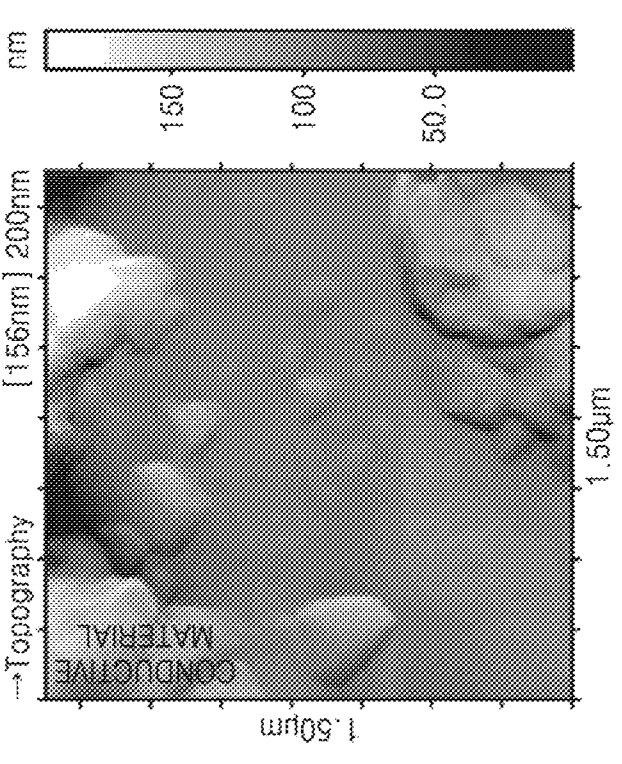
FIGS. 9C and 9D show images of the results of atomic force microscopy (AFM) analysis of a particle surface.
Figure 9D:
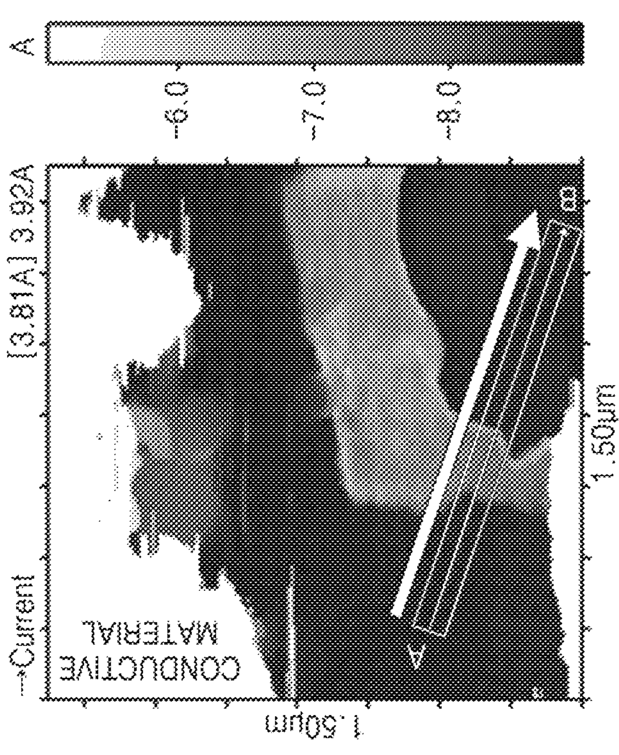
Figure 9E:
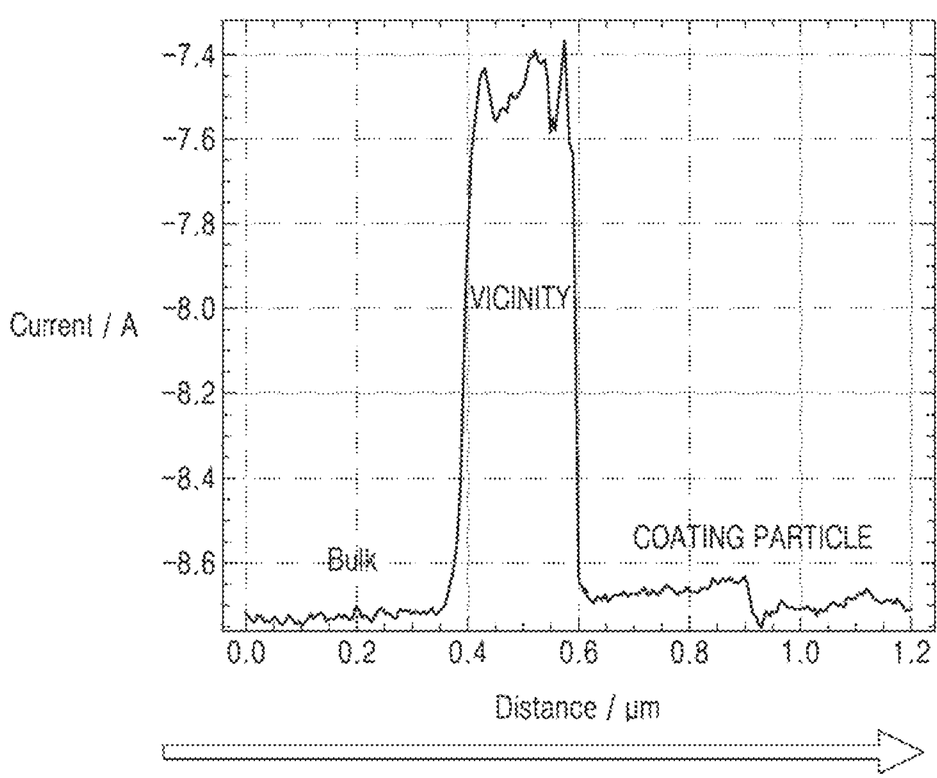
FIG. 9E is a graph of current (amperes, A) vs. distance (micrometers, μm) and shows results of conductivity evaluation of a bulk region, a particle coating portion, and a surface coating portion of a composite positive electrode active material obtained according to Example 1.

Conductivity at a bulk area, a particle coating portion, and a surface coating portion area in the composite positive electrode active material obtained according to Example 1 was evaluated using atomic force microscopy (AFM). The results of evaluation are shown in FIGS. 9A to 10E. FIG. 9A and FIG. 9B are SEM images, FIG. 9C and FIG. 9D are electric current images of a particle surface, and FIG. 9E shows an electric current measured along the arrow from point A to point B in FIG. 9D, wherein 0 in the X-axis in FIG. 9E corresponds to point A in FIG. 9D and 1.2 in the X-axis in FIG. 9E corresponds to point B in FIG. 9D.

In view of the above, it could be confirmed that in the composite positive electrode active material obtained according to Example 1, when electrical conductivities at Zr particle, particle vicinity, and LCO bulk surface were compared, electrical conductivity at the particle vicinity was higher than the electrical conductivities of other areas.

Evaluation Example 9: Energy Filtering Transmission Electron Microscopy & Electron Beam Energy Loss (EF-TEM & EELS)

Figure 10A:
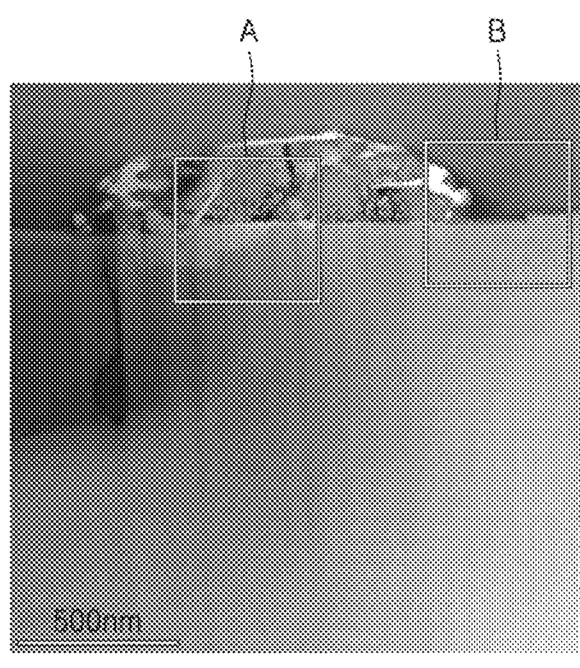
FIG. 10A is a TEM image of the composite positive electrode active material of Example 1 and shows indicated regions A and B.
Figure 10B:
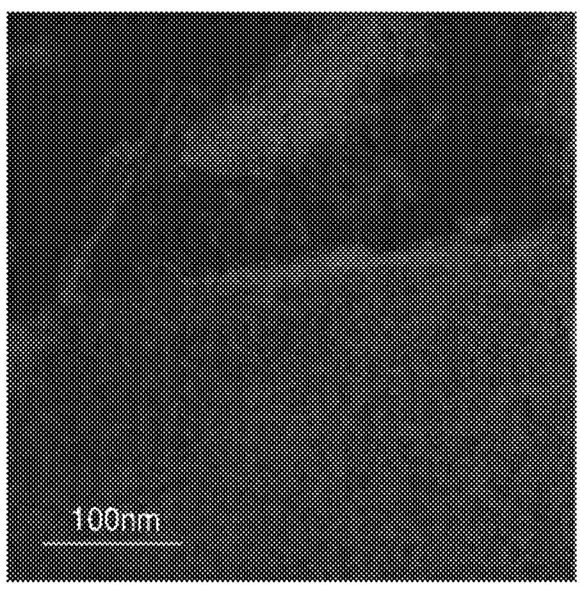
FIGS. 10B and 10C each show the results of energy filtering transmission electron microscope (EF-TEM) analysis of the composite positive electrode active material of Example 1 of indicated regions A and B of FIG. 10A, respectively.
Figure 10C:
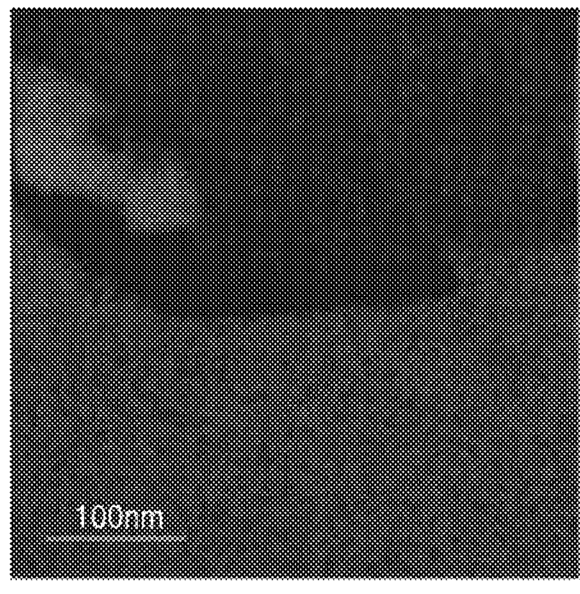

EF-TEM and EELS analyses were performed on the composite positive electrode active material of Example 1, and the analysis results are shown in FIGS. 10A to 10C.

Figure 10D:
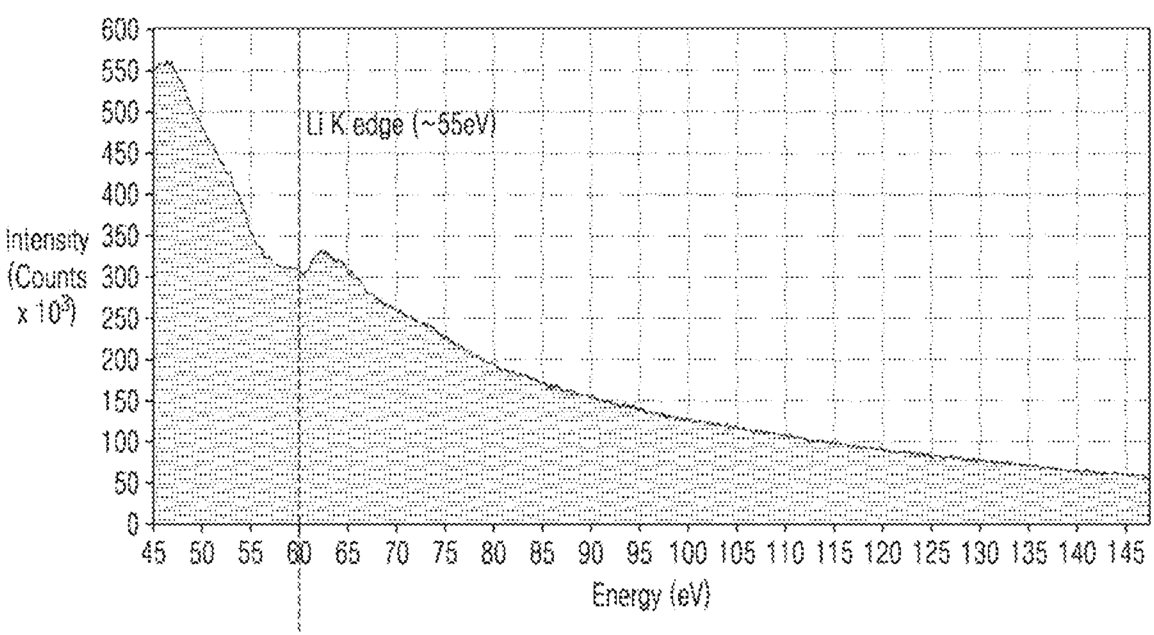
FIGS. 10D and 10E are each a graph of intensity (counts×1000) vs. energy (electron volts) and show the results of electron beam energy loss (EELS) analysis of the composite positive electrode active material of Example 1.
Figure 10E:
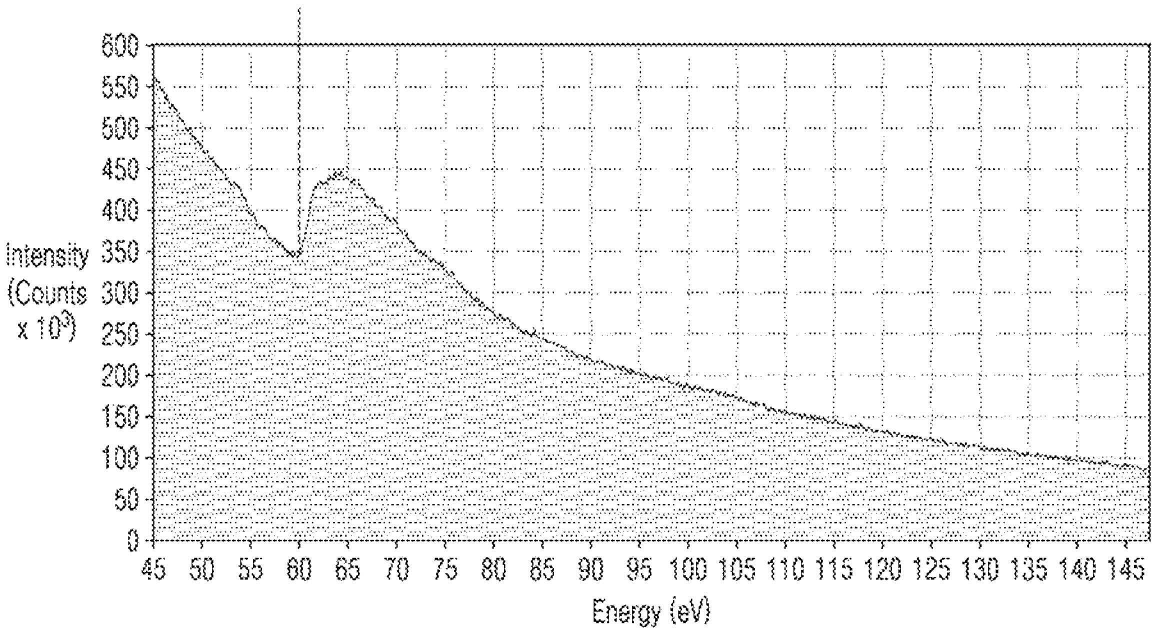

FIG. 10A shows an EDS MAP measurement area, FIG. 10B is an EDS lithium-mapping image of the left square area in FIG. 10A, and FIG. 10C is an EDS lithium-mapping image of the right square area in FIG. 10A. In addition, FIG. 10D and FIG. 10E show the results of EELS analysis of the particle coating portion and LCO, respectively.

In view of the above, it could be confirmed that lithium is evenly distributed in the particle coating portion and inner region of the composite positive electrode active material of Example 1.

Evaluation Example 10: HR-TEM (High-Resolution Transmission Electron Microscopy)(II)

HR-TEM analysis was performed on the composite positive electrode active material of Example 1 to investigate crystal structures of the lithium-deficient cobalt oxide phase present inside the LCO.

Figure 11A:
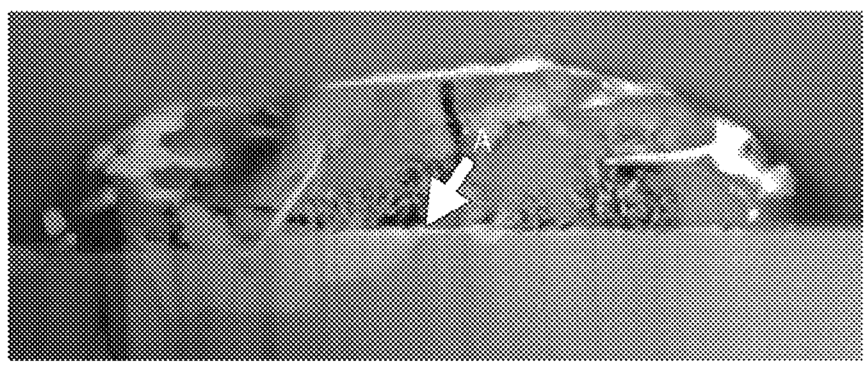
FIGS. 11A to 11B show the results of high-resolution transmission electron microscopy (HR-TEM) analysis of the composite positive electrode active material of Example 1.
Figure 11B:
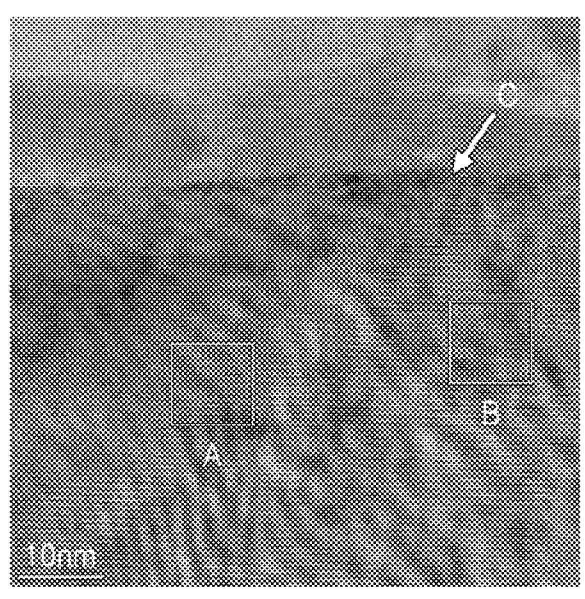
Figure 11C:
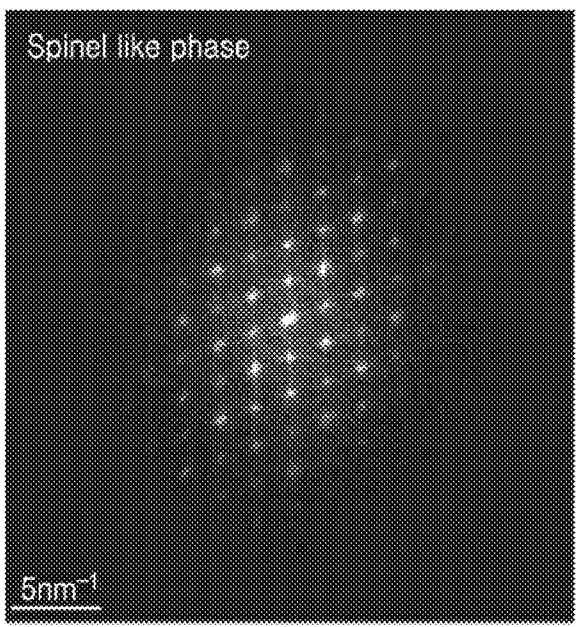
FIGS. 11C and 11D each show the results of crystal structure analysis of regions A and B of FIG. 11B, respectively.
Figure 11D:
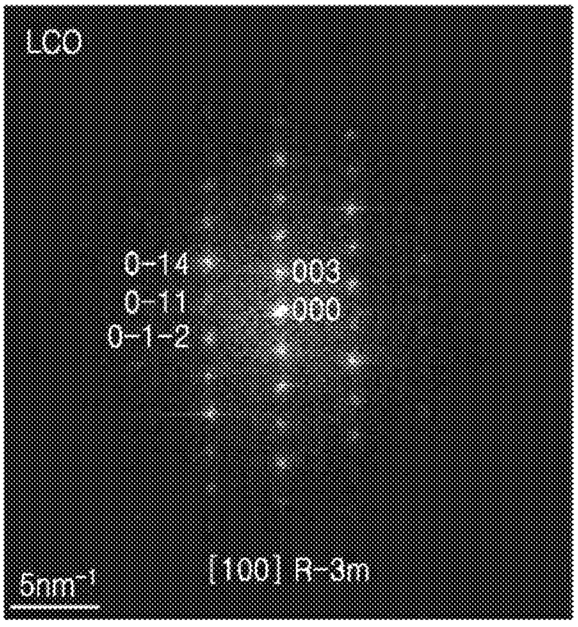

The HR-TEM analysis results are shown in FIGS. 11A to 11D. FIG. 11A shows an analysis area, FIG. 11B is an HR-TEM image showing a magnified view of an area indicated with the arrow A in FIG. 11A, and FIG. 11C and FIG. 11D show crystal structure images using TEM, of the area A and the area B in FIG. 11B, respectively.

Upon examining bright areas on the surface of LCO, which is core active material, and the LCO interface indicated by arrow C in FIG. 11B, a spinel-like phase was observed in LCO layered structure where a regular ordering having a length twice the existing d-spacing was generated in (014) and (012) plane directions.

The composite positive electrode active material according to an embodiment can have improved conductivity and also exhibit an effect of inhibiting surface phase transitions to suppress surface side reactions with electrolyte solution. By including a positive electrode including the above-described composite positive electrode active material, a lithium secondary battery having improved high-voltage characteristics can be prepared.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A composite positive electrode active material for a lithium secondary battery, the composite positive electrode active material comprising:

a lithium cobalt oxide particle; and a particle coating portion in a form of an island and on a first surface of the lithium cobalt oxide particle, the particle coating portion comprising a first coating layer comprising a lithium titanium oxide, wherein the lithium cobalt oxide particle comprises a lithium-deficient cobalt oxide phase positioned between the particle coating portion and a core of the lithium cobalt oxide particle, the lithium-deficient cobalt oxide phase having a molar ratio of lithium to cobalt of about 0.9 or less, and a surface coating portion located between a second surface of the lithium cobalt oxide particle and the core of the lithium cobalt oxide particle, wherein the particle coating portion further comprises a second coating layer, and the second coating layer is on and radially outward of the first coating layer and comprises a lithium zirconium oxide, wherein a content of the lithium zirconium oxide is about 0.05 part by weight to about 0.2 part by weight, with respect to 100 parts by weight of the lithium cobalt oxide particle.

2. The composite positive electrode active material of claim 1, wherein the lithium cobalt oxide particle comprises cobalt and further comprises magnesium and aluminum.

3. The composite positive electrode active material of claim 2, wherein the lithium cobalt oxide particle has an aluminum content of equal to or greater than 4,000 parts per million, and a magnesium content of equal to or greater than 1,000 parts per million.

4. The composite positive electrode active material of claim 1, wherein a mole ratio of magnesium to cobalt comprised in the lithium-deficient cobalt oxide phase is greater than a mole ratio of magnesium to cobalt in the lithium cobalt oxide particle.

5. The composite positive electrode active material of claim 1, wherein the lithium-deficient cobalt oxide phase has a spinel crystal structure, and the lithium-deficient cobalt oxide phase is present in a region within 100 nanometers from a third surface of the lithium cobalt oxide particle, wherein the third surface is an outer surface.

6. The composite positive electrode active material of claim 1, wherein the surface coating portion comprises a third coating layer having a spinel crystal structure.

7. The composite positive electrode active material of claim 1, wherein a content of the lithium-deficient cobalt oxide phase is about 0.1 part by weight to about 1 part by weight, with respect to 100 parts by weight of the lithium cobalt oxide particle.

8. The composite positive electrode active material of claim 1, wherein the lithium-deficient cobalt oxide phase comprises a compound represented by Formula 5, a compound represented by Formula 5-1, a compound represented by Formula 5-2, or a combination thereof:

$$Li_{1-\alpha}Mg_{a}Co_{1-x}M_{x}O_{2}, \quad \text{Formula 5}$$

wherein, in Formula 5, M is W, Mo, Zr, Ti, Mg, Ta, Al, Fe, V, Cr, Ba, Ca, Nb, or a combination thereof, and $0.1 \le \alpha \le 0.5$, $0 < a \le 0.05$, and $0 \le x \le 0.05$, $$Li_{1-\alpha}Mg_{a}Co_{2-x}M_{x}O_{4}, \quad \text{Formula 5-1}$$

wherein, in Formula 5-1, M is W, Mo, Zr, Ti, Mg, Ta, Al, Fe, V, Cr, Ba, Ca, Nb, or a combination thereof, and $0.1 \le \alpha \le 0.5$, $0 < a \le 0.05$, and $0 \le x \le 0.05$, or $$Co_{3-x}M_{x}O_{4}, \quad \text{Formula 5-2}$$

wherein, in Formula 5-2, M is W, Mo, Zr, Ti, Mg, Ta, Al, Fe, V, Cr, Ba, Ca, Nb, or a combination thereof, and $0.01 \le \alpha \le 0.05$, $0 \le a \le 0.05$, and $0 \le x \le 0.05$, or $$Co_{3-x}M_{x}O_{4}, \quad \text{Formula 5-2}$$

wherein, in Formula 5-2, M is W, Mo, Zr, Ti, Mg, Ta, Al, Fe, V, Cr, Ba, Ca, Nb, or a combination thereof, and $0 \le x \le 0.05$.

9. The composite positive electrode active material of claim 1, wherein the lithium zirconium oxide is a compound represented by Formula 2:

$$Li_{2+a}Zr_{(1-x-z)}Co_zM2_xO_3 \quad \text{Formula 2}$$

wherein, in Formula 2, M2 is B, Mg, Ca, Sr, Ba, Ti, V, Cr, Fe, Cu Al, or a combination thereof, and $-0.1 \le a \le 0.1$, $0 \le x < 1$, and $0 \le z \le 0.1$.

10. The composite positive electrode active material of claim 1, wherein the lithium titanium oxide is a compound represented by Formula 1:

$$Li_{2+a}Ti_{(1-x-y)}Co_xMg_yO_3 \quad \text{Formula 3}$$

wherein in Formula 1, $-0.1 \le a \le 0.1$, $0 < x \le 0.5$, and $0 < y \le 0.1$.

11. The composite positive electrode active material of claim 1, wherein the surface coating portion comprises a lithium cobalt oxide comprising $LiCo_2O_4$.

12. The composite positive electrode active material of claim 11, wherein a content of the lithium cobalt oxide comprising $LiCo_2O_4$ in the surface coating portion is about 0.01 part by weight to about 1 part by weight, with respect to 100 parts by weight of the lithium cobalt oxide particle.

13. The composite positive electrode active material of claim 1, wherein the lithium cobalt oxide particle is a compound represented by Formula 3:

$$Li_{a-b}Mg_bCo_{(1-x-y-b)}Al_xM3_yO_2, \quad \text{Formula 3}$$

wherein, in Formula 3, $0.9 \le a \le 1.1$, $0 \le b \le 0.02$, $0 \le x \le 0.04$, and $0 \le y \le 0.01$, and M3 is Ni, K, Na, Ca, Mg, Si, Fe, Cu, Zn, Ti, Sn, V, Ge, Ga, B, P, Se, Bi, As, Zr, Mn, Cr, Ge, Sr, V, Sc, Y, or a combination thereof.

14. The composite positive electrode active material of claim 1, wherein a content of the lithium titanium oxide in the particle coating portion is about 0.05 part by weight to about 1.0 part by weight, with respect to 100 parts by weight of the lithium cobalt oxide particle.

15. The composite positive electrode active material of claim 1, wherein the lithium cobalt oxide particle comprises a small particle, a large particle, or a mixture thereof.

16. The composite positive electrode active material of claim 15, wherein the large particle has a size of about 10 micrometers to about 20 micrometers, and the small particle has a size of about 3 micrometers to about 6 micrometers.

17. The composite positive electrode active material of claim 15, wherein a weight ratio of the large particle to the small particle in the mixture of the large particle and the small particle is about 7:3 to about 9:1.

18. A method of preparing a composite positive electrode active material for a lithium secondary battery, the method comprising:

mixing a lithium cobalt oxide, a titanium precursor, and cobalt hydroxide to obtain a first precursor mixture;

heat-treating the first precursor mixture to form a heat-treated first precursor mixture;

mixing the heat-treated first precursor mixture with a zirconium precursor to obtain a second precursor mixture; and heat-treating the second precursor mixture, to thereby prepare the composite positive electrode active material of claim 1.

19. The method of claim 18, wherein a content of the cobalt hydroxide is about 3.5 parts by weight to about 7 parts by weight, with respect to 100 parts by weight of the lithium cobalt oxide particle.

20. The method of claim 18, wherein a content of the zirconium precursor is about 0.2 part by weight to about 0.54 part by weight, with respect to 100 parts by weight of the lithium cobalt oxide particle.

21. The method of claim 18, wherein the zirconium precursor is zirconium oxide, and the titanium precursor is titanium hydroxide, titanium chloride, titanium sulfate, titanium oxide, or a combination thereof.

22. The method of claim 18, wherein the lithium cobalt oxide particle comprises a small particle, a large particle, or a mixture thereof.

23. The method of claim 18, wherein the heat-treating of the first precursor mixture comprises heat-treating at about 850° C. to about 980° C.

24. The method of claim 18, wherein the heat-treating of the second precursor mixture comprises heat-treating at about 750°° C. to about 900° C.

25. A lithium secondary battery, comprising:

a positive electrode comprising the composite positive electrode active material of claim 1;

a negative electrode; and an electrolyte between the positive electrode and the negative electrode.

* * * * *